(12) United States Patent
Ishiga

(10) Patent No.: US 7,362,897 B2
(45) Date of Patent: Apr. 22, 2008

(54) INTERPOLATION PROCESSING APPARATUS AND RECORDING MEDIUM HAVING INTERPOLATION PROCESSING PROGRAM RECORDED THEREIN

(75) Inventor: Kenichi Ishiga, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/477,666

(22) Filed: Jun. 30, 2006

(65) Prior Publication Data

US 2006/0245646 A1    Nov. 2, 2006

Related U.S. Application Data

(60) Division of application No. 11/367,583, filed on Mar. 6, 2006, which is a continuation of application No. 09/877,002, filed on Jun. 11, 2001, now abandoned, which is a continuation of application No. PCT/JP00/09040, filed on Dec. 20, 2000.

(30) Foreign Application Priority Data

Dec. 21, 1999  (JP)  ................................ 11-363007
Jul. 6, 2000  (JP)  ............................. 2000-204768

(51) Int. Cl.
 G06K 9/00  (2006.01)
 G06K 9/32  (2006.01)
 H04N 9/64  (2006.01)
(52) U.S. Cl. ........................ 382/167; 382/300; 348/246
(58) Field of Classification Search ................ 382/162, 382/167, 254, 299, 300; 348/246, 441; 358/525
 See application file for complete search history.

(56) References Cited

U.S. PATENT DOCUMENTS

| 4,605,956 | A | * | 8/1986 | Cok | ........................... 348/242 |
| 4,642,678 | A | | 2/1987 | Cok | |
| 4,663,655 | A | | 5/1987 | Freeman | |
| 4,724,395 | A | | 2/1988 | Freeman | |
| 4,774,565 | A | | 9/1988 | Freeman | |
| 4,796,085 | A | * | 1/1989 | Shinada | ...................... 358/525 |
| 5,534,914 | A | | 7/1996 | Flohr et al. | |
| 5,534,919 | A | | 7/1996 | Nobuoka | |
| 5,541,653 | A | | 7/1996 | Peters et al. | |
| 5,552,827 | A | | 9/1996 | Maenaka et al. | |

(Continued)

FOREIGN PATENT DOCUMENTS

JP    A 5-48886    2/1993

(Continued)

*Primary Examiner*—Colin LaRose
(74) *Attorney, Agent, or Firm*—Oliff & Berridge, PLC

(57) ABSTRACT

A first interpolation processing apparatus that engages in processing on image data which are provided in a colorimetric system constituted of first~nth ($n \geq 2$) color components and include color information corresponding to a single color component provided at each pixel to determine an interpolation value equivalent to color information corresponding to the first color component for a pixel at which the first color component is missing, includes: an interpolation value calculation section that uses color information at pixels located in a local area containing an interpolation target pixel to undergo interpolation processing to calculate an interpolation value including, at least (1) local average information of the first color component with regard to the interpolation target pixel and (2) local curvature information corresponding to at least two color components with regard to the interpolation target pixel.

15 Claims, 19 Drawing Sheets

U.S. PATENT DOCUMENTS

| | | |
|---|---|---|
| 5,629,734 A | 5/1997 | Hamilton, Jr. et al. |
| 5,799,113 A | 8/1998 | Lee |
| 5,805,216 A | 9/1998 | Tabei et al. |
| 5,805,217 A | 9/1998 | Lu et al. |
| 5,901,242 A | 5/1999 | Crane et al. |
| 6,075,889 A | 6/2000 | Hamilton, Jr. et al. |
| 6,091,851 A * | 7/2000 | Acharya ............ 382/167 |
| 6,091,862 A | 7/2000 | Okisu |
| 6,130,960 A | 10/2000 | Acharya |
| 6,356,276 B1 * | 3/2002 | Acharya ............ 345/600 |
| 6,724,945 B1 | 4/2004 | Yen et al. |
| 6,744,916 B1 | 6/2004 | Takahashi |
| 6,747,698 B2 * | 6/2004 | Abe ............ 358/525 |
| 6,809,765 B1 * | 10/2004 | Tao ............ 382/276 |
| 7,053,908 B2 | 5/2006 | Saquib et al. |

FOREIGN PATENT DOCUMENTS

| | | |
|---|---|---|
| JP | A 8-65696 | 3/1996 |
| JP | A 8-228296 | 9/1996 |
| JP | A 11-75060 | 3/1999 |
| JP | A 11-331860 | 11/1999 |
| JP | A 2000-197067 | 7/2000 |

* cited by examiner

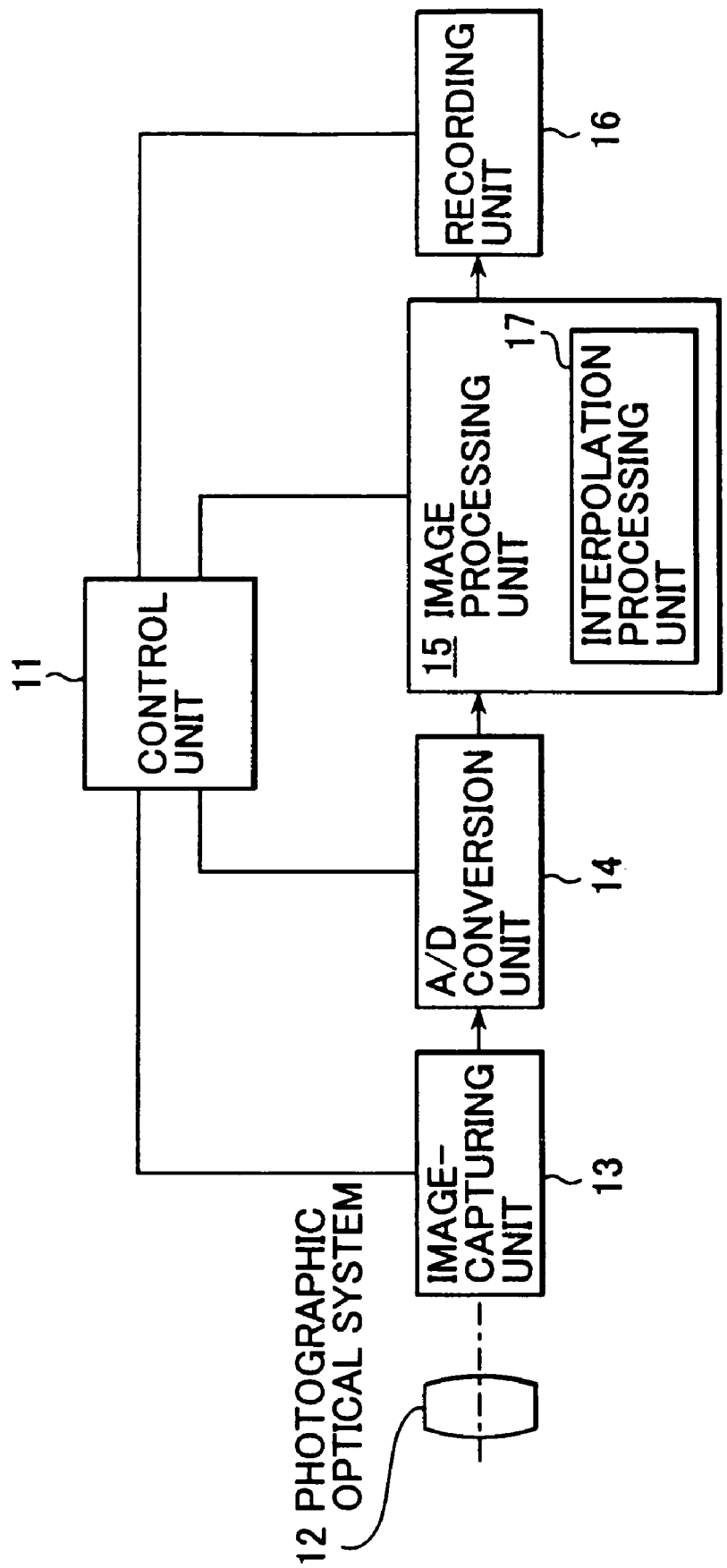

FIG.2A

| COORDINATES [i, j] | i−3 | i−2 | i−1 | i | i+1 | i+2 | i+3 |
|---|---|---|---|---|---|---|---|
| j−3 | B | G | B | G | B | G | B |
| j−2 | G | R | G | R | G | R | G |
| j−1 | B | G | B | G | B | G | B |
| j | G | R | G | R | G | R | G |
| j+1 | B | G | B | G | B | G | B |
| j+2 | G | R | G | R | G | R | G |
| j+3 | B | G | B | G | B | G | B |

FIG.2B

| COORDINATES [i, j] | i−3 | i−2 | i−1 | i | i+1 | i+2 | i+3 |
|---|---|---|---|---|---|---|---|
| j−3 | R | G | R | G | R | G | R |
| j−2 | G | B | G | B | G | B | G |
| j−1 | R | G | R | G | R | G | R |
| j | G | B | G | B | G | B | G |
| j+1 | R | G | R | G | R | G | R |
| j+2 | G | B | G | B | G | B | G |
| j+3 | R | G | R | G | R | G | R |

FIG.3A

| COORDINATES [i, j] | i-2 | i-1 | i | i+1 | i+2 |
|---|---|---|---|---|---|
| j-2 | R | G | R | G | R |
| j-1 | B | G | B | G | B |
| j | R | G | R | G | R |
| j+1 | B | G | B | G | B |
| j+2 | R | G | R | G | R |

FIG.3B

| COORDINATES [i, j] | i-2 | i-1 | i | i+1 | i+2 |
|---|---|---|---|---|---|
| j-2 | B | G | B | G | B |
| j-1 | R | G | R | G | R |
| j | B | G | B | G | B |
| j+1 | R | G | R | G | R |
| j+2 | B | G | B | G | B |

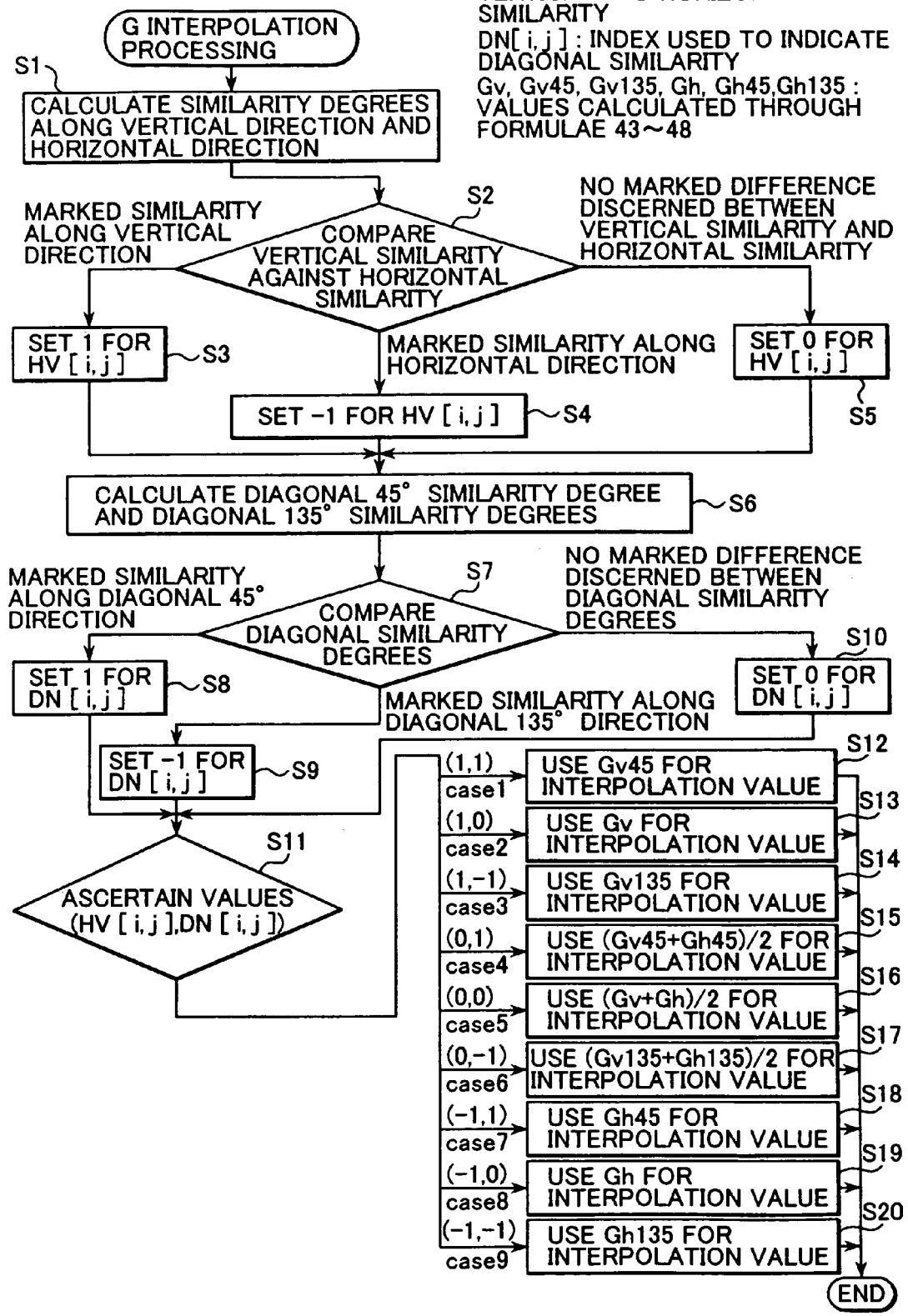

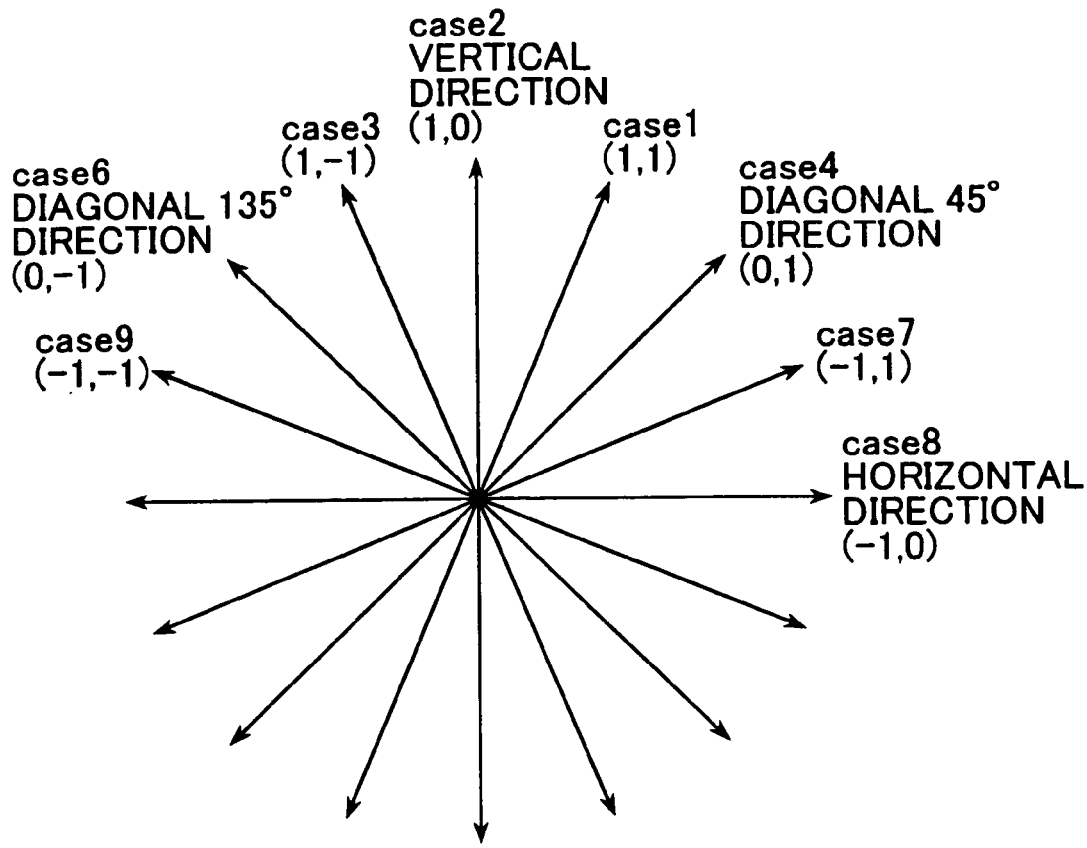

FIG.8
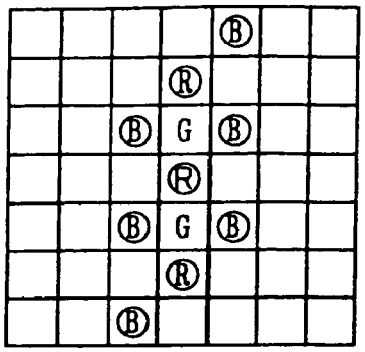
case1 : (HV,DN)=(1,1)
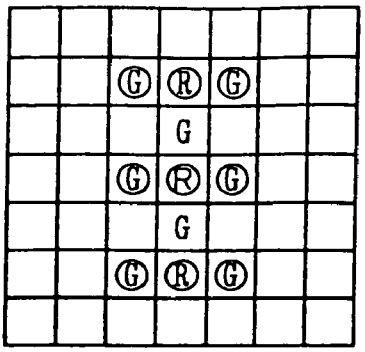
case2 : (HV,DN)=(1,0)
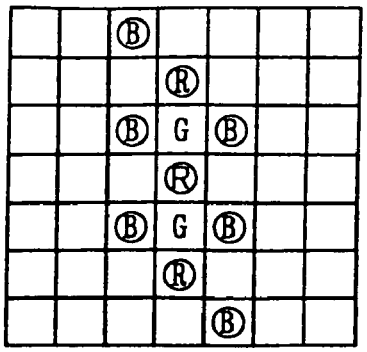
case3 : (HV,DN)=(1,-1)
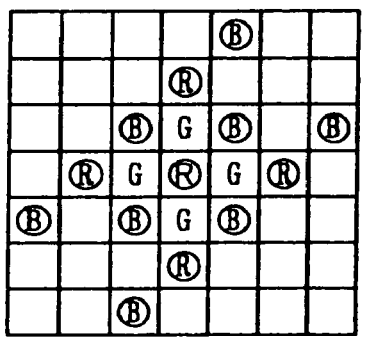
case4 : (HV,DN)=(0,1)
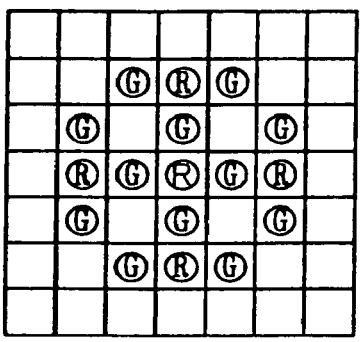
case5 : (HV,DN)=(0,0)
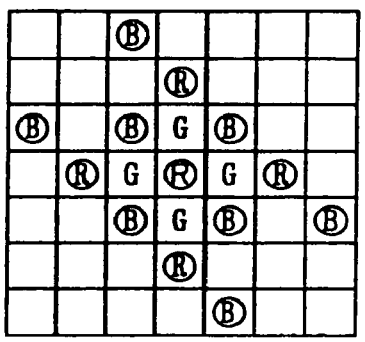
case6 : (HV,DN)=(0,-1)
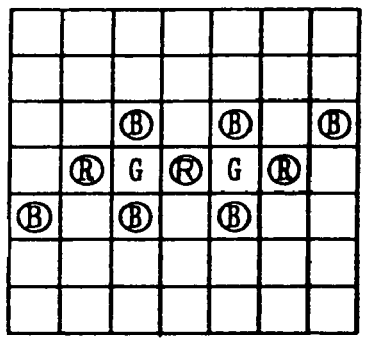
case7 : (HV,DN)=(-1,1)
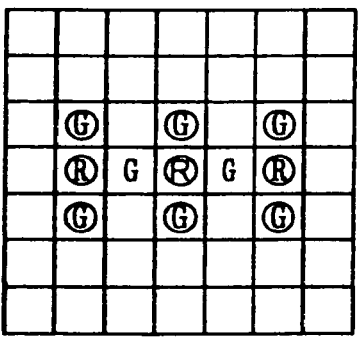
case8 : (HV,DN)=(-1,0)
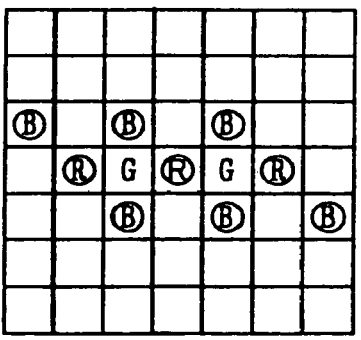
case9 : (HV,DN)=(-1,-1)

FIG.10A

| Y | ◁ | Y |
|---|---|---|
| O | × | O |
| Y | ◁ | Y |

FIG.10B

| Cr | ◁ | Cr |
|----|---|----|
| O  | × | O  |
| Cr | ◁ | Cr |

FIG.10C

| Cb | ◁ | Cb |
|----|---|----|
| O  | × | O  |
| Cb | ◁ | Cb |

FIG.11A

| COORDINATES [m,n] | m-1 | m | m+1 |
|---|---|---|---|
| n-1 | Cr | | Cr |
| n | | × | |
| n+1 | Cr | | Cr |

FIG.11B

| COORDINATES [m,n] | m-1 | m | m+1 |
|---|---|---|---|
| n-1 | | Cr | |
| n | Cr | × | Cr |
| n+1 | | Cr | |

FIG.12A

| Cr |   | Cr |
|----|---|----|
|    | × |    |
| Cr | ○ | Cr |
|    | × |    |
| Cr |   | Cr |

FIG.12B

| Cr |   | Cr |   | Cr |
|----|---|----|---|----|
|    | × | △  | × |    |
| Cr |   | Cr |   | Cr |

FIG.13
RED COLOR COMPONENT
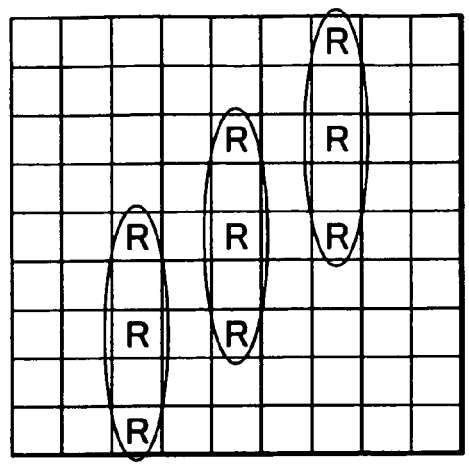
δRv45
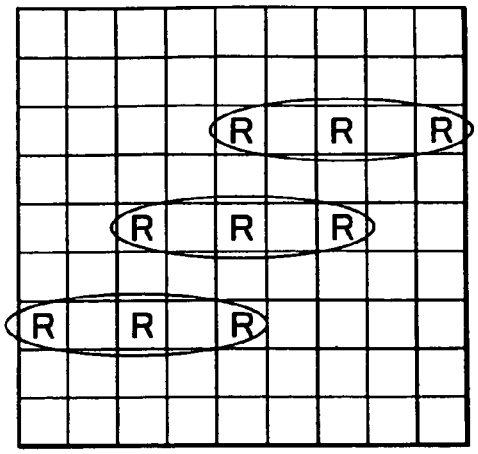
δRh45
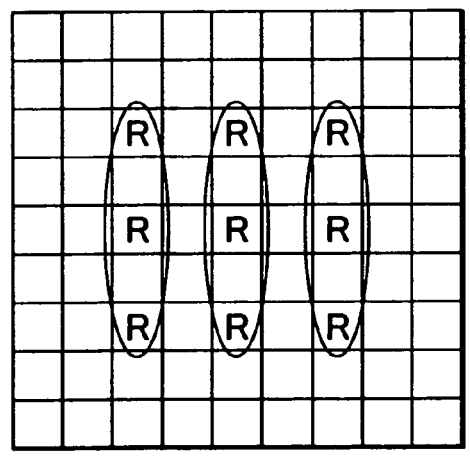
δRv
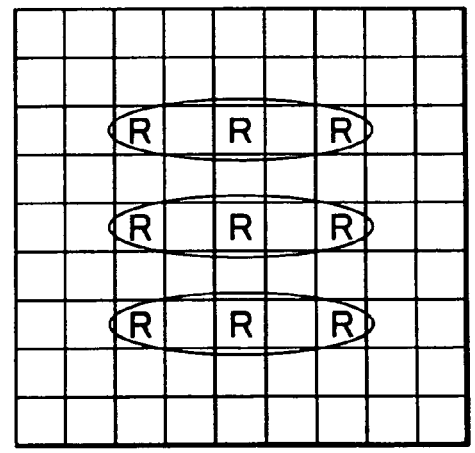
δRh
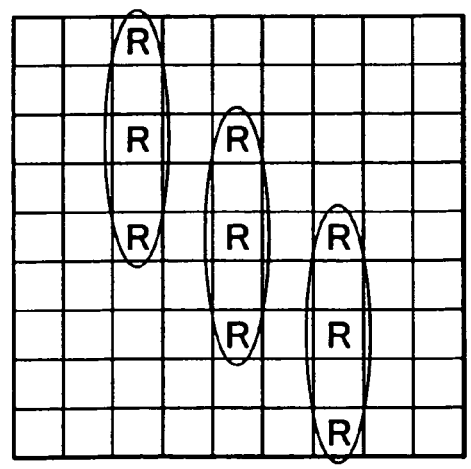
δRv135
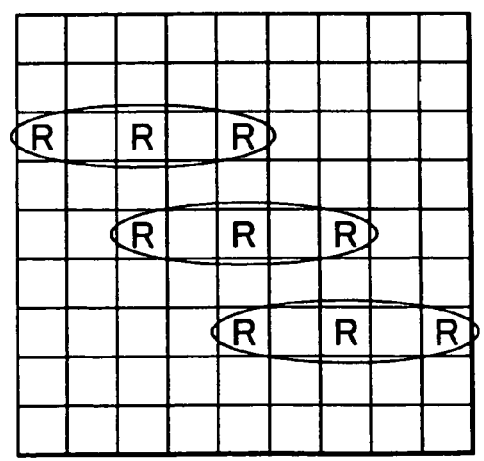
δRh135

FIG.14
GREEN COLOR COMPONENT
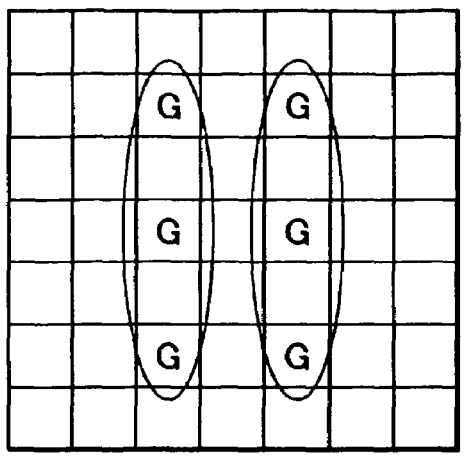
$\delta Gv$
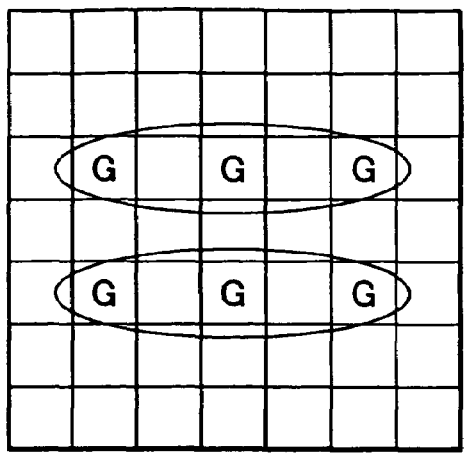
$\delta Gh$
BLUE COLOR COMPONENT
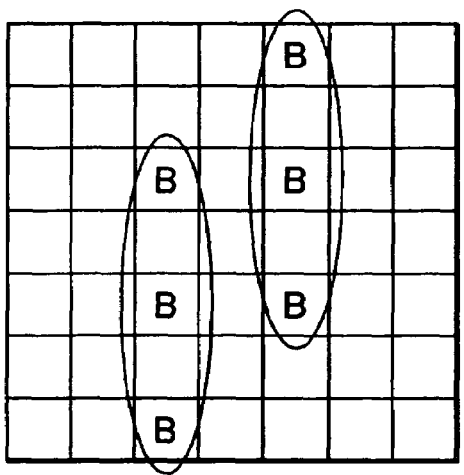
$\delta Bv45$
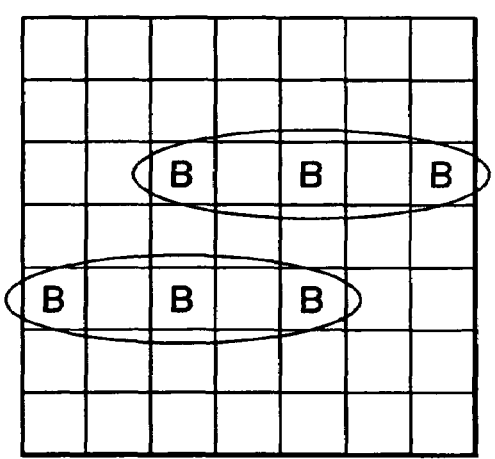
$\delta Bh45$
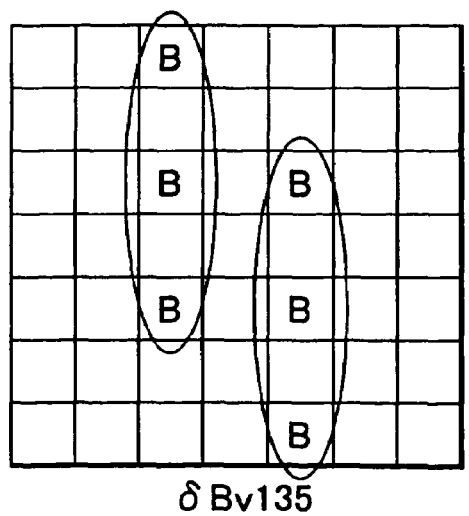
$\delta Bv135$
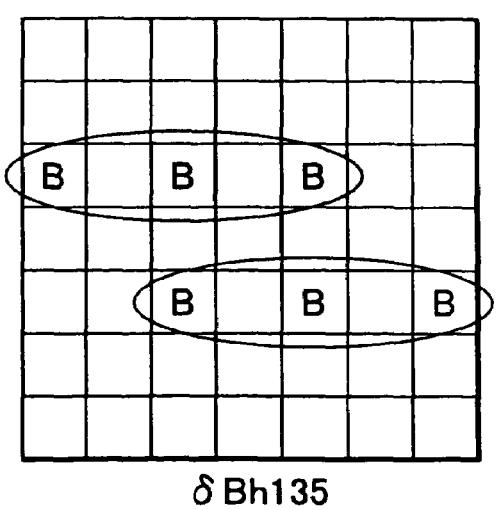
$\delta Bh135$

WHEN THERE IS NO MAGNIFICATION CHROMATIC ABERRATION

WHEN THERE IS MAGNIFICATION CHROMATIC ABERRATION

WHEN THERE IS MAGNIFICATION CHROMATIC ABERRATION

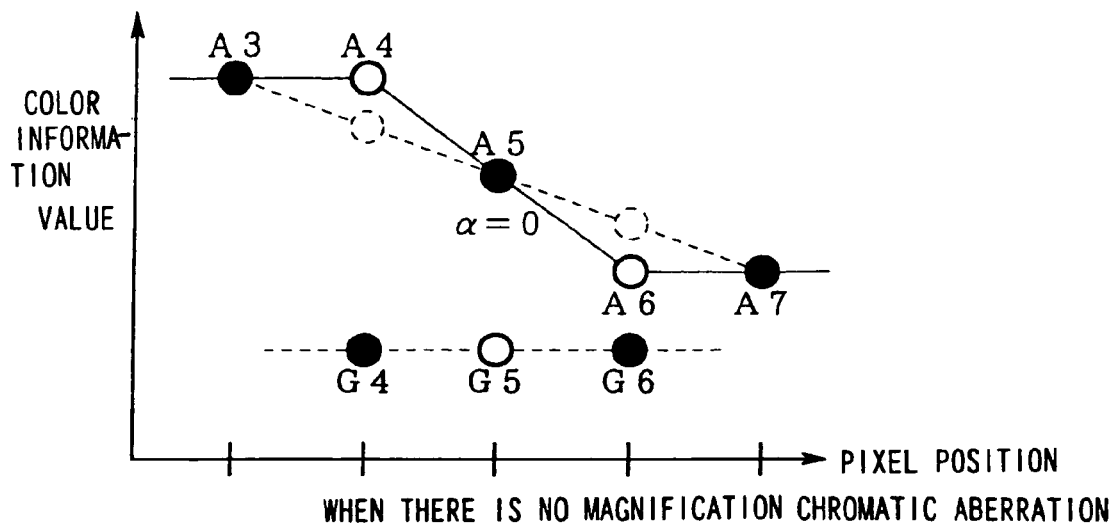
FIG. 19A — WHEN THERE IS NO MAGNIFICATION CHROMATIC ABERRATION
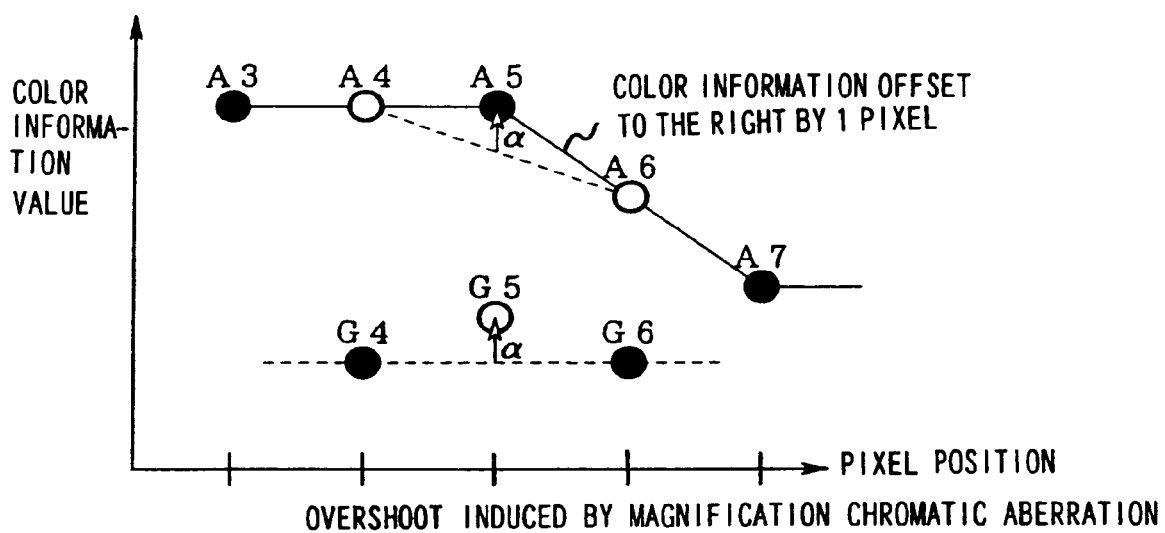
FIG. 19B — OVERSHOOT INDUCED BY MAGNIFICATION CHROMATIC ABERRATION
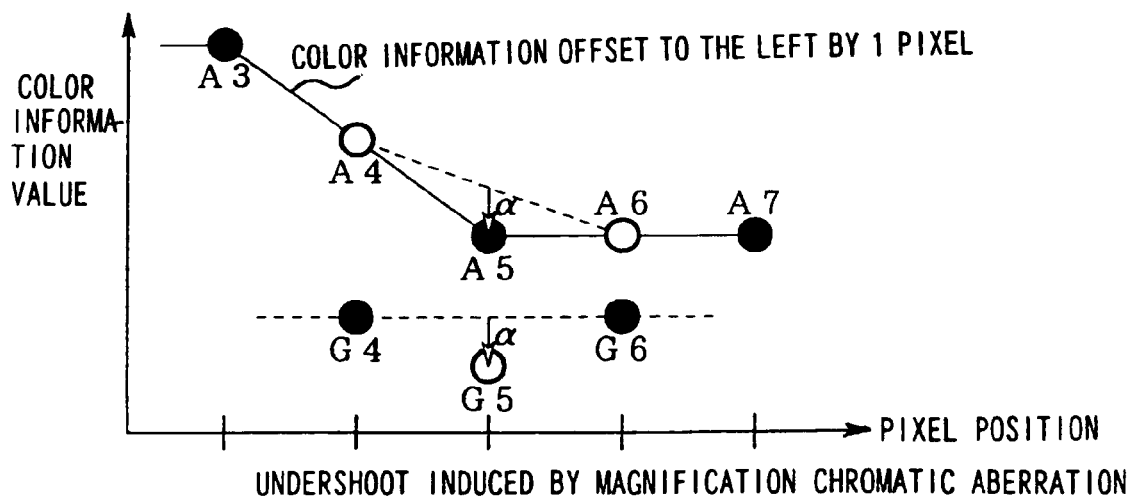
FIG. 19C — UNDERSHOOT INDUCED BY MAGNIFICATION CHROMATIC ABERRATION

OVERSHOOT INDUCING STATE

UNDERSHOOT INDUCING STATE

INTERPOLATION PROCESSING APPARATUS AND RECORDING MEDIUM HAVING INTERPOLATION PROCESSING PROGRAM RECORDED THEREIN

This application is a Divisional of application Ser. No. 11/367,583, filed on Mar. 6, 2006, which is a Continuation of application Ser. No. 09/877,002 filed Jun. 11, 2001 now abandoned, which is a continuation of International Application No. PCT/JP00/09040 filed Dec. 20, 2000. The entire disclosure of the prior applications is hereby incorporated by reference herein in their entirety.

INCORPORATION BY REFERENCE

The disclosures of following applications are herein incorporated by reference: Japanese Patent Application No. H11-363007 filed Dec. 21, 1999; Japanese Patent Application No. 2000-204768 filed Jul. 6, 2000; and International Application No. PCT/JP00/09040 filed Dec. 20, 2000.

BACKGROUND OF THE INVENTION

1. Field of the Invention

The present invention relates to an interpolation processing apparatus that engages in interpolation processing on color image data to supplement a color component and a luminance component missing in pixels and a recording medium having an interpolation processing program for achieving the interpolation processing on a computer, that can be read by a computer.

2. Description of the Related Art

Some electronic cameras generate color image data by employing an image-capturing sensor having three color (R, G and B: red, green and blue) color filters provided at specific positions (e.g., a Bayer array). In such an electronic camera in which the individual pixels at the image-capturing sensor each output color information corresponding to only a single color component, it is necessary to implement interpolation processing to obtain color information corresponding to all the color components for each pixel.

In an interpolation processing method proposed in the prior art, spatial similarity manifested by an interpolation target pixel undergoing the interpolation processing is judged and an interpolation value is calculated by using the color information output from pixels positioned along the direction in which a high degree of similarity is manifested.

For instance, in the art disclosed in U.S. Pat. No. 5,629,734, a green color interpolation value G5 for the interpolation target pixel is calculated through one formula among formula 1 through formula 3 when the color information corresponding to individual pixels is provided as shown below, with A5 representing the color information at the interpolation target pixel (a pixel with the green color component missing), A1, A3, A7 and A9 representing color information from pixels provided with color filters in the same color as the color of the filter at the interpolation target pixel and G2, G4, G6 and G8 representing color information from pixels provided with green color filters.

A1
G2
A3 G4 A5 G6 A7
G8
A9

If a marked similarity manifests along the horizontal direction, the green color interpolation value G5 for the interpolation target pixel is calculated through;

$$G5=(G4+G6)/2+(-A3+2A5-A7)/4 \quad \text{(formula 1)}.$$

If a marked similarity manifests along the vertical direction, the green color interpolation value G5 for the interpolation target pixel is calculated through;

$$G5=(G2+G8)/2+(-A1+2A5-A9)/4 \quad \text{(formula 2)}.$$

If roughly equal degrees of similarity manifest along the horizontal direction and the vertical direction, the green color interpolation value G5 for the interpolation target pixel is calculated through $$G5=(G2+G4+G6+G8)/4+(-A1-A3+4A5-A7-A9)/8 \quad \text{(formula 3)}.$$

It is to be noted that in order to simplify the subsequent explanation, the first terms ((G4+G6)/2, (G2+G8)/2) in formulae 1 and 2 are each referred to as a primary term and that second terms ((−A3+2A5−A7)/4, (−A1+2A5−A9)/4) in formulae 1 and 2 are each referred to as a correctional term.

In U.S. Pat. No. 5,629,734, assuming that the image data undergoing the interpolation processing manifest marked similarity along the horizontal direction with A3, G4, A5, G6 and A7 provided as indicated with ● marks in FIG. 17, A4 representing the average of A3 and A5, and A6 representing the average of A5 and A7, the value of the correctional term in formula 1 is equivalent to the vector quantity (α in FIG. 17) representing the difference between A5 and the average of A4 and A6. In addition, the green color interpolation value G5 is equivalent to a value achieved by correcting the average of the values indicated by the color information from pixels adjacent along the horizontal direction (corresponds to the value of the primary term in formula 1) by α.

In other words, in the art disclosed in U.S. Pat. No. 5,629,734, a green color interpolation value is calculated by assuming that the color difference between the green color component and the color component (the red color component or the blue color component) at the interpolation target pixel is constant ((A4-G4), (A5-G5) and (A6-G6) in FIG. 17 match) and correcting the average of the values indicated by the color information from the pixels that are adjacent along the direction in which a high degree of similarity is manifested with color information corresponding to the same color component as that of the interpolation target pixel.

Optical systems such as lenses are known to manifest magnification chromatic aberration. For instance, if there is magnification chromatic aberration at the photographic lens of an electronic camera having an image-capturing sensor provided with color filters in three colors, i.e., R, G and B, arranged in a Bayer array, images corresponding to the red color component and the blue color component are formed at positions slightly offset from the position at which the image corresponding to the green color component is formed, as shown in FIGS. 18B and 18C.

If the photographic lens is free of any magnification chromatic aberration and color information corresponding to the individual pixels is provided as indicated by the ● marks in FIG. 19A (the image data undergoing the interpolation processing manifest marked similarity along the horizontal direction, the color information corresponding to the green color component indicates a constant value and the values indicated by the color information corresponding to the red color component and the color information corresponding to the blue color component both change gently in the vicinity of the interpolation target pixel (the pixel at which A5 is present), the value of the correctional term in formula 1 is 0 and, as a result, the average of G4 and G6 (the primary term) is directly used as the green color interpolation value G5 without correction.

However, when A3, A5 and A7 each represent color information corresponding to the red color component and each set of color information corresponding to the red color component is offset by one pixel to the right due to a magnification chromatic aberration at the photographic lens, the color information from the individual pixels undergoes a change as shown in FIG. 19B. Consequently, the value of the correctional term in formula 1 is not 0 and the primary term is over-corrected (hereafter referred to as an "over-correction") in such a case, resulting in the green color interpolation value G5 that should be similar to the values indicated by G4 and G6 becoming larger than the G4 and G6 values (hereafter this phenomenon is referred to as an "overshoot"). If, on the other hand, A3, A5 and A7 each represent color information corresponding to the blue color component and each set of color information corresponding to the blue color component is offset by one pixel to the left due to a magnification chromatic aberration, the color information from the individual pixels undergoes a change as shown in FIG. 19C. Thus, the value of the correctional term in formula 1 is not 0, resulting in the green color interpolation value G5 that should be similar to the G4 and G6 values becoming smaller than those corresponding to G4 and G6 (hereafter this phenomenon is referred to as an "undershoot") through an over-correction.

In other words, the art disclosed in U.S. Pat. No. 5,629,734 poses a problem in that color artifacts occur in the color image obtained through the interpolation processing due to a magnification chromatic aberration.

An over correction also occurs at a color boundary where the color difference changes as well as when there is a magnification chromatic aberration. For instance, the color information corresponding to the individual pixels is provided as indicated by the ● marks in FIGS. 20A and 20B (when the color information corresponding to the green color component is constant and the values identified by the color information corresponding to the red color component or the blue color component change drastically near the interpolation target pixel (the pixel at which A5 is present)), the value of the correctional term in formula 1 is not 0 and, an overshoot or an undershoot occurs due to an over correction with regard to the green color interpolation value G5, which should be similar to the values indicated by G4 and G6.

Thus, in a color boundary where the color difference changes, a color artifact occurs as a result of interpolation processing even if there is no magnification chromatic aberration. It is to be noted that such a color artifact as that described above may occur when calculating a red color interpolation value or α blue color interpolation value as well as when calculating α green color interpolation value.

SUMMARY OF THE INVENTION

An object of the present invention is to provide an interpolation processing apparatus capable of preventing occurrence of color artifacts and a recording medium having recorded therein an interpolation processing program with which occurrence of color artifacts can be prevented.

More specifically, an object of the present invention is to suppress the occurrence of color artifacts by reducing the problems of the prior art while retaining the advantages of the interpolation processing in the prior art and reducing the degree of the adverse effect of magnification chromatic aberration.

In order to achieve the object described above, a first interpolation processing apparatus according to the present invention that engages in processing on image data which are provided in a calorimetric system constituted of first~nth ($n \geq =2$) color components and include color information corresponding to a single color component provided at each pixel to determine an interpolation value equivalent to color information corresponding to the first color component for a pixel at which the first color component is missing, comprises: an interpolation value calculation section that uses color information at pixels located in a local area containing an interpolation target pixel to undergo interpolation processing to calculate an interpolation value including, at least (1) local average information of the first color component with regard to the interpolation target pixel and (2) local curvature information corresponding to at least two color components with regard to the interpolation target pixel.

Namely, the first interpolation processing apparatus calculates an interpolation value by correcting the "local average information of the first color component with regard to the interpolation target pixel" with the "local curvature information corresponding to at least two color components with regard to the interpolation target pixel."

It is to be noted that in the explanation of the first interpolation processing apparatus, the "local average information of the first color component with regard to the interpolation target pixel" may be the average of the values indicated by the color information corresponding to the first color component present in the local area containing the interpolation target pixel or a value within the range of the values indicated by the color information corresponding to the first color component in the local area containing the interpolation target pixel. In addition, the "local curvature information corresponding to at least two color components with regard to the interpolation target pixel" refers to information that indicates how the color information corresponding to at least two color components in the local area containing the interpolation target pixel changes. In other words, the local curvature information corresponding to a given color component is information that indicates the degree of change in the rate of change occurring with regard to the color component in the local area, and when the values corresponding to each color component are plotted and rendered as a curve (or a polygonal line), the information indicates the curvature and the degree of change in the curvature (this definition applies in the subsequent description). The information, which may be obtained by calculating a quadratic differential or a higher differential of the color component, indicates a value reflecting structural information with regard to fluctuations in the values corresponding to the color component. When the information is rendered in a polygonal line, it indicates changes in the inclinations of the individual line segments.

A second interpolation processing apparatus achieves that in the first interpolation processing apparatus the interpolation value calculation section calculates, as the local curvature information corresponding to at least two color components, (1) local curvature information based upon a color component matching a color component at the interpolation target pixel and (2) local curvature information based upon a color component other than the color component at the interpolation target pixel.

Namely, in the second interpolation processing apparatus, the interpolation value is calculated by correcting the "local average information of the first color component with regard to the interpolation target pixel" with the "local curvature information based upon a color component matching the color component at the interpolation target pixel" and the "local curvature information based upon a color component other than the color component at the interpolation target pixel."

It is to be noted that in the explanation of the second interpolation processing apparatus, the "local curvature information based upon a color component matching the color component at the interpolation target pixel (or a color component other than the color component at the interpolation target pixel)" refers to information that indicates how the color information corresponding to the color component matching the color component at the interpolation target pixel (or a color component other than the color component at the interpolation target pixel) in the local area containing the interpolation target pixel changes and is represented as a value reflecting the structural information regarding the fluctuations obtained through calculation of a quadratic differential or a higher differential of the color component.

A third interpolation processing apparatus that engages in processing on image data which are provided in a colorimetric system constituted of first~nth ($n \geq 2$) color components and include color information corresponding to a single color component provided at each pixel to determine an interpolation value equivalent to color information corresponding to the first color component for a pixel at which the first color component is missing, comprises: an interpolation value calculation section that uses color information at pixels located in a local area containing an interpolation target pixel to undergo interpolation processing to calculate an interpolation value including, at least (1) local average information of the first color component with regard to the interpolation target pixel and (2) local curvature information based upon a color component other than a color component at the interpolation target pixel.

Namely, in the third interpolation processing apparatus, the interpolation value is calculated by correcting the "local average information of the first color component with regard to the interpolation target pixel" with the "local curvature information based upon a color component other than the color component at the interpolation target pixel."

It is to be noted that in the explanation of the third interpolation processing apparatus, the "local curvature information based upon a color component other than the color component at the interpolation target pixel" refers to information that indicates how the color information corresponding to the color component other than the color component at the interpolation target pixel in the local area containing the interpolation target pixel changes and is represented as a value reflecting the structural information regarding the fluctuations obtained through calculation of a quadratic differential or a higher differential of the color component.

A fourth interpolation processing apparatus that engages in processing on image data which are provided in a calorimetric system constituted of first~nth ($n \geq 2$) color components and include color information corresponding to a single color component provided at each pixel to determine an interpolation value equivalent to color information corresponding to the first color component for a pixel at which the first color component is missing, comprises: an interpolation value calculation section that uses color information at pixels located in a local area containing an interpolation target pixel to undergo interpolation processing to calculate an interpolation value including, at least (1) local average information of the first color component with regard to the interpolation target pixel and (2) local curvature information corresponding to the first color component with respect to the interpolation target pixel.

Namely, in the fourth interpolation processing apparatus, the interpolation value is calculated by correcting the "local average information of the first color component with regard to the interpolation target pixel" with the "local curvature information corresponding to the first color component with regard to the interpolation target pixel"

It is to be noted that in the explanation of the fourth interpolation processing apparatus, the "local curvature information corresponding to the first color component with respect to the interpolation target pixel" refers to information that indicates how the color information corresponding to the first color component in the local area containing the interpolation target pixel changes and is represented as a value reflecting the structural information regarding the fluctuations obtained through calculation of a quadratic differential or a higher differential of the color component.

A fifth interpolation processing apparatus achieves that in the first through third interpolation processing apparatus a first similarity judgment section that judges degrees of similarity to the interpolation target pixel along at least two directions in which pixels with color information corresponding to the first color component are connected with the interpolation target pixel; and a second similarity judgment section that judges degrees of similarity to the interpolation target pixel along at least two directions other than the directions in which the degrees of similarity are judged by the first similarity judgment section, are further provided, and: the interpolation value calculation section selects a direction along which pixels having color information to be used to calculate the local average information of the first color component are set based upon results of a judgment made by the first similarity judgment section; (1) the interpolation value calculation section selects a direction along which pixels having color information to be used to calculate the local curvature information are set based upon results of the judgment made by the first similarity judgment section if the local curvature information is "local curvature information constituted of a single color component and manifesting directionality along a direction in which degrees of similarity are judged by the first similarity judgment section"; and (2) the interpolation value calculation section selects a direction along which pixels having color information to be used to calculate the local curvature information are set based upon results of a judgment made by the second similarity judgment section if the local curvature information is "local curvature information constituted of a single color component and manifesting directionality along a direction in which degrees of similarity are judged by the second similarity judgment section."

Namely, in the fifth interpolation processing apparatus, any of the "local curvature information corresponding to at least two color components with regard to the interpolation target pixel" in the first interpolation processing apparatus and the "local curvature information based upon a color component matching the color component at the interpolation target pixel" and the "local curvature information based upon a color component other than the color component at interpolation target pixel" in the second or the third interpolation processing apparatus that constitutes "local curvature information constituted of a single color component and manifesting directionality along a direction in which degrees of similarity are judged by the first similarity judgment section" is calculated by using color information at pixels present along a direction selected based upon the results of the judgment made by the first similarity judgment section, whereas any of the information listed above that constitutes "local curvature information constituted of a single color component and manifesting directionality along a direction in which degrees of similarity are judged by the second similarity judgment section" is calculated by using color information at pixels present along a direction selected based upon the results of the judgment made by the second similarity judgment section.

It is to be noted that the details of the directions along which the various types of local curvature information manifest directionality are to be defined in the "Best Mode For Carrying Out The Invention".

As described above, the color information used to calculate local curvature information can be selected in correspondence to degrees of similarity to the interpolation target pixel in the fifth interpolation processing apparatus. In addition, the color information used to calculate the local average information of the first color component, too, can be selected in correspondence to the degrees of similarity to the interpolation target pixel.

A sixth interpolation processing apparatus that engages in processing on image data which are provided in a calorimetric system constituted of first~nth (n≧2) color components and include color information corresponding to a single color component provided at each pixel to determine an interpolation value equivalent to color information corresponding to the first color component for a pixel at which the first color component is missing, comprises: an interpolation value calculation section that calculates an interpolation value including at least two terms, i.e., a first term and a second term by using color information at pixels set in a local area containing an interpolation target pixel to undergo interpolation processing; a first similarity judgement section that judges degrees of similarity to the interpolation target pixel along at least two directions in which pixels having color information corresponding to the first color component are connected to the interpolation target pixel; and a second similarity judgment section that judges degrees of similarity to the interpolation target pixel along at least two directions other than the directions in which the degrees of similarity are judged by the first similarity judgment section, wherein: the interpolation value calculation section selects a direction along which pixels having color information to be used to calculate the first term are set based upon results of a judgment made by the first similarity judgment section and selects a direction along which pixels having color information to be used to calculate the second term are set based upon results of a judgment made by the second similarity judgment section.

Namely, in the sixth interpolation processing apparatus, in which the directions in which similarity is judged by the second similarity judgment section are different from the directions along which similarity is judged by the first similarity judgment section, the processing can be performed by using color information from pixels set along more directions including the direction along which color information used to calculate the second term is provided as well as the direction along which color information used to calculate the first term is provided.

Thus, the interpolation value can be calculated by using color information at pixels located along a finely differentiated plurality of directions in the sixth interpolation processing apparatus. In addition, the first term and the second term can be calculated by using color information at pixels set along the direction in which a high degree of similarity is manifested or through weighted synthesis of color information from pixels located along a plurality of directions, which is performed in correspondence to varying degrees of similarity, in the sixth interpolation processing apparatus.

A seventh interpolation processing apparatus achieves that in the sixth interpolation processing apparatus the interpolation value calculation section: calculates a term containing (a) local average information of the first color component with regard to the interpolation target pixel and (b) local curvature information constituted of a single color component and manifesting directionality along a direction in which degrees of similarity are judged by the first similarity judgment section, as the first term; and calculates a term containing local curvature information constituted of a single color component and manifesting directionality along a direction in which degrees of similarity are judged by the second similarity judgment section, as the second term.

Namely, in the seventh interpolation processing apparatus, the interpolation value is calculated by correcting the "local average information of the first color component with regard to the interpolation target pixel" with the "local curvature information constituted of a single color component and manifesting directionality along a direction in which degrees of similarity are judged by the first similarity judgment section" and the "local curvature information constituted of a single color component and manifesting directionality along a direction in which degrees of similarity are judged by the second similarity judgment section."

It is to be noted that the details of the directions along which the various types of local curvature information manifest directionality are to be defined in the "Best Mode For Carrying Out The Invention".

An eighth interpolation processing apparatus achieves that in the fifth or seventh interpolation processing apparatus: when image data are provided in a calorimetric system constituted of first~third color components with the first color component achieving a higher spatial frequency than the second color component and the third color component, the first color component set in a checker-board pattern, the second color component and the third color component each set in a line sequence between pixels at which color information corresponding to the first color component is present and information corresponding to the second color component present at the interpolation target pixel; the first similarity judgment section calculates similarity degrees manifested by the interpolation target pixel along two directions, i.e., a vertical direction and a horizontal direction, in which pixels with color information corresponding to the first color component that are closest to the interpolation target pixel are connected to the interpolation target pixel and makes a judgment with regard to degrees of similarity manifested by the interpolation target pixel along the vertical direction and the horizontal direction based upon a difference between the similarity degrees; the second similarity judgment section calculates similarity degrees manifested by the interpolation target pixel along two diagonal directions in which pixels with color information corresponding to the third color component that are closest to the interpolation target pixel are connected to the interpolation target pixel and makes a judgment with regard to degrees of similarity manifested by the interpolation target pixel along the two diagonal directions based upon a difference between the similarity degrees; and the interpolation value calculation section selects at least either the second color component or the first color component based upon which the "local curvature information constituted of a single color component and manifesting directionality along a direction in which degrees of similarity are judged by the first similarity judgment section" is provided and selects at least either the second color component or the third color component based upon which the "local curvature information constituted of a single color component and manifesting directionality along a direction in which degrees of similarity are judged by the second similarity judgment section" is provided.

The details of the directions along which the various types of local curvature information manifest directionality are to be defined in the "Best Mode For Carrying Out The Invention".

In the eighth interpolation processing apparatus, the color component manifesting directionality along the two directions, i.e., the vertical direction and the horizontal direction in which degrees of similarity are judged by the first similarity judgment section, includes the second color component and the first color component and the color components manifesting directionality along the two diagonal directions in which degrees of similarity are judged by the second similarity judgment section includes the second color component and the third color component.

Thus, the "local curvature information constituted of a single color component and manifesting directionality along a direction in which degrees of similarity are judged by the first similarity judgment section" in the fifth or seventh interpolation processing apparatus is calculated with respect to at least either the second color component or the first color component based upon the results of the judgment made by the first similarity judgment section and the "local curvature information constituted of a single color component and manifesting directionality along a direction in which degrees of similarity are judged by the second similarity judgment section" is calculated with respect to at least either the second color component or the third color component based upon the results of the judgment made by the second similarity judgment section.

In addition, in the eighth interpolation processing apparatus, the similarity manifesting along the diagonal directions is reflected with a high degree of reliability when calculating the "local curvature information based upon a color component achieving similarity along a direction in which degrees of similarity are judged by the second similarity judgment section."

A ninth interpolation processing apparatus achieves that in the eighth interpolation processing apparatus: when the local curvature information is "local curvature information based upon a color component other than the color component at the interpolation target pixel", the interpolation value calculation section selects the first color component or the third color component to which the local curvature information is to correspond in conformance to the degrees of similarity judged by the second similarity judgment section.

In the ninth interpolation processing apparatus, the third color component is present at pixels adjacent to the interpolation target pixel along the two diagonal directions and the similarity judged by the second similarity judgment section is the similarity manifested by the interpolation target pixel along the two diagonal directions.

In other words, in the ninth interpolation processing apparatus, the similarity along the diagonal directions can be reflected in the "local curvature information based upon a color component other than the color component at the interpolation target pixel" by switching the "local curvature information based upon a color component other than the color component at the interpolation target pixel" to correspond to the first color component or the third color component.

A tenth interpolation processing apparatus achieves that in the ninth interpolation processing apparatus: the interpolation value calculation section calculates local curvature information based upon the first color component if the second similarity judgment section judges that roughly equal degrees of similarity manifest along the two diagonal directions and calculates local curvature information based upon the third color component if the second similarity judgment section judges that a higher degree of similarity manifests along one of the two diagonal directions compared to the other diagonal direction.

Namely, in the 10th interpolation processing apparatus, the similarity manifesting along the diagonal directions is reflected with a high degree of reliability when calculating the "local curvature information based upon a color component other than the color component at the interpolation target pixel."

An 11th interpolation processing apparatus achieves that in the eighth interpolation processing apparatus: the first similarity judgment section judges that roughly equal degrees of similarity manifest along the vertical direction and the horizontal direction if a difference between the similarity degrees along the vertical direction and the horizontal direction is smaller than a specific threshold value; and the second similarity judgment section judges that roughly equal degrees of similarity manifest along the two diagonal directions if a difference between the similarity degrees along the two diagonal directions is smaller than a specific threshold value.

As a result, the adverse effect of noise can be reduced in the judgement of the similarity along the two directions, i.e., the vertical direction and the horizontal direction and the similarity manifesting along the two diagonal directions in the 11th interpolation processing apparatus.

A 12th interpolation processing apparatus achieves that in the eighth interpolation processing apparatus: the first similarity judgment section calculates the similarity degrees along the vertical direction and the horizontal direction by using color information corresponding to a plurality of color components for a single interpolation target pixel; and the second similarity judgment section calculates the similarity degrees along the two diagonal directions by using color information corresponding to a plurality of color components for a single interpolation target pixel.

In other words, in the 12th interpolation processing apparatus, color information corresponding to a plurality of color components is reflected in the judgement of the similarity manifesting along the vertical and horizontal directions and the similarity manifesting along the two diagonal directions.

A 13th interpolation processing apparatus achieves that in the twelfth interpolation processing apparatus: the second similarity judgment section calculates a similarity degree manifesting along each of the two diagonal directions through weighted addition of: (1) a similarity degree component constituted of color information corresponding to the first color component alone; (2) a similarity degree component constituted of color information corresponding to the second color component alone; (3) a similarity degree component constituted of color information corresponding to the third color component alone; and (4) a similarity degree component constituted of color information corresponding to the second color component and the third color component.

As a result, color information corresponding to a plurality of color components is reflected with a high degree of reliability in the judgement of the similarity manifesting along the two diagonal directions in the 13th interpolation processing apparatus.

A 14th interpolation processing apparatus achieves that in the eighth: the first similarity judgment section calculates similarity degrees along the vertical direction and the horizontal direction for each pixel and makes a judgment on similarity manifested by the interpolation target pixel along the vertical direction and the horizontal direction based upon differences in similarity degrees manifesting at nearby pixels as well as at the interpolation target pixel; and the second similarity judgment section calculates similarity degrees along the two diagonal directions for each pixel and makes a judgment on similarity manifested by the interpolation target pixel along the two diagonal directions based upon differences in similarity degrees manifesting at nearby pixels as well as at the interpolation target pixel.

Namely, in the 14th interpolation processing apparatus, the continuity with the nearby pixels is reflected in the judgement of the similarity manifesting along the vertical and horizontal directions and the similarity manifesting along the two diagonal directions.

A 15th interpolation processing apparatus that engages in processing on image data which are provided in a calorimetric system constituted of first~nth (n≧2) color components and include color information corresponding to a single color component provided at each pixel to determine an interpolation value equivalent to color information corresponding to the first color component for a pixel at which the first color component is missing, comprises: a first term calculation section that calculates a first term representing average information of the first color component with regard to an interpolation target pixel to undergo interpolation processing by using color information corresponding to color components at pixels set in a local area containing the interpolation target pixel; a second term calculation section that calculates a second term representing local curvature information based upon a color component matching the color component at the interpolation target pixel with regard to the interpolation target pixel by using color information corresponding to color components at pixels set in a local area containing the interpolation target pixel; and an interpolation value calculation section that calculates an interpolation value by adding the second term multiplied by a weighting coefficient constituted of color information corresponding to a plurality of color components at pixels in the local area containing the interpolation target pixel to the first term.

In other words, in the 15th interpolation processing apparatus, the interpolation value is calculated by correcting the "average information of the first color component with regard to the interpolation target pixel" with the "local curvature information based upon a color component matching the color component at the interpolation target pixel with regard to the interpolation target pixel" multiplied by a weighting coefficient constituted of color information corresponding to a plurality of color components present at pixels within a local area containing the interpolation target pixel.

A 16th interpolation processing apparatus achieves that in the 15th interpolation processing apparatus: the interpolation value calculation section uses color information corresponding to a plurality of color components provided at the interpolation target pixel and at a plurality of pixels set along a predetermined direction relative to the interpolation target pixel to ascertain inclinations manifesting in color information corresponding to the individual color components along the direction and calculates the weighting coefficient in conformance to a correlation manifesting among the inclinations in the color information corresponding to the individual color components.

As a result, in the 16th interpolation processing apparatus, in which the "average information of the first color component with regard to the interpolation target pixel" is corrected with the "local curvature information based upon a color component matching the color component at the interpolation target pixel with regard to the interpolation target pixel" multiplied by the weighting coefficient, and the weighting coefficient is calculated in conformance to the correlation among the inclinations of the color information corresponding to the different color components in the local area containing the interpolation target pixel.

A 17th interpolation processing apparatus that implements processing for supplementing a color component value at a pixel at which information corresponding to a color component is missing in image data provided in a calorimetric system constituted of a luminance component and the color component, with the luminance component having a higher spatial frequency than the color component and the luminance component present both at pixels having information corresponding to the color component and at pixels lacking information corresponding to the color component, comprises: a hue value calculation section that calculates hue values at a plurality of pixels located near an interpolation target pixel to undergo interpolation processing and having both the luminance component and the color component by using luminance component values and color component values at the individual pixels; a hue value interpolation section that calculates a hue value at the interpolation target pixel by using a median of the hue values at the plurality of pixels calculated by the hue value calculation section; and a color conversion section that interpolates a color component at the interpolation target pixel by using the luminance component at the interpolation target pixel to convert the hue value at the interpolation target pixel calculated by the hue value interpolation section to a color component.

Namely, in the 17th interpolation processing apparatus, the hue value of the interpolation target pixel is calculated by using the median of the hue values of a plurality of pixels located near the interpolation target pixel.

A 18th interpolation processing apparatus that implements processing for supplementing a luminance component at a pixel at which information corresponding to a luminance component is missing and supplementing a color component at a pixel at which information corresponding to a color component is missing, on image data provided in a calorimetric system constituted of the luminance component and the color component, with the luminance component having a higher spatial frequency than the color component and a given pixel having only information corresponding to either the luminance component or the color component, comprises: a luminance component interpolation section that interpolates a luminance component at a luminance component interpolation target pixel to undergo luminance component interpolation processing by using at least either "similarity manifesting between the luminance component interpolation target pixel and a pixel near the luminance component interpolation target pixel" or "a plurality of color components within a local area containing the luminance component interpolation target pixel"; a hue value calculation section that calculates hue values at a plurality of pixels located near an interpolation target pixel to undergo color component interpolation processing, having color component values and having luminance component values interpolated by the luminance component interpolation section, by using the luminance component values and color component values at the individual pixels; a hue value interpolation section that calculates a hue value for the interpolation target pixel by using a median of the hue values at the plurality of pixels calculated by the hue value calculation section; and a color conversion section that interpolates a color component value for the interpolation target pixel by using the luminance component value at the interpolation target pixel to convert the hue value at the interpolation target pixel calculated by the hue value interpolation section to a color component value.

Namely, in the 18th interpolation processing apparatus, the hue value of the interpolation target pixel is calculated by using the median of the hue values of a plurality of pixels located near the interpolation target pixel.

A 19th interpolation processing apparatus achieves that in the 17th or 18th interpolation processing apparatus: when the luminance component in the image data corresponds to a green color component and the color component in the image data corresponds to a red color component and a blue color component, the hue value interpolation section calculates a hue value for the interpolation target pixel by using a median of hue values containing the red color component at pixels near the interpolation target pixel if the green color component is present but the red color component is missing at the interpolation target pixel and calculates a hue value for the interpolation target pixel by using a median of hue values containing the blue color component at pixels near the interpolation target pixel if the green color component is present but the blue color component is missing at the interpolation target pixel.

In other words, in the 19th interpolation processing apparatus, the hue value of the interpolation target pixel at which the green color component is present but the red color component is missing is calculated by using the median of the hue values containing the red color component from pixels located near the interpolation target pixel, whereas the hue value of the interpolation target pixel at which the green color component is present but the blue color component is missing is calculated by using the median of the hue values containing the blue color component from pixels located near the interpolation target pixel.

A 20th interpolation processing apparatus achieves that in the 17th or 18th interpolation processing apparatus: when the luminance component in the image data corresponds to a green color component and the color component in the image data corresponds to a red color component and a blue color component, the hue value interpolation section calculates a hue value for the interpolation target pixel by using a median of hue values containing the red color component at pixels set near the interpolation target pixel if the blue color component is present but the red color component is missing at the interpolation target pixel.

Namely, in the 20th interpolation processing apparatus, the hue value of the interpolation target pixel at which the blue color component is present but the red color component is missing is calculated by using the median of the hue values containing the red color component from pixels located near the interpolation target pixel.

A 21st interpolation processing apparatus achieves that in the 17th or 18th interpolation processing apparatus: when the luminance component in the image data corresponds to a green color component and the color component in the image data corresponds to a red color component and a blue color component, the hue value interpolation section calculates a hue value for the interpolation target pixel by using a median of hue values containing the blue color component at pixels set near the interpolation target pixel if the red color component is present but the blue color component is missing at the interpolation target pixel.

Namely, in the 21st interpolation processing apparatus, the hue value of the interpolation target pixel at which the red color component is present but the blue color component is missing is calculated by using the median of the hue values containing the blue color component from pixels located near the interpolation target pixel.

A 22nd interpolation processing apparatus achieves that in the any one of the 17th through 21st interpolation processing apparatus a color component is missing at the interpolation target pixel present at only one pixel among four pixels set symmetrically along the vertical direction and the horizontal direction, and the hue value interpolation section comprises: a first hue value interpolation unit that calculates a hue value for the interpolation target pixel by using a median of hue values at a plurality of diagonally adjacent pixels if the hue values of the plurality of diagonally adjacent pixels adjacent to the interpolation target pixel along diagonal directions have been calculated by the hue value calculation section; and a second hue value interpolation unit that calculates a hue value for the interpolation target pixel by using a median of hue values at a plurality of vertically and horizontally adjacent pixels if the hue values of the plurality of vertically and horizontally adjacent pixels adjacent to the interpolation target pixel in the vertical direction and the horizontal direction have been calculated by the hue value calculation section or the first hue value interpolation unit.

In other words, in the 22nd interpolation processing apparatus, if the hue values at pixels adjacent along the diagonal directions are already calculated, the hue value of the interpolation target pixel is calculated by using the median of the hue values at the diagonally adjacent pixels, whereas if the hue values at pixels adjacent in the vertical and horizontal directions are already calculated, the hue value of the interpolation target pixel is calculated by using the median of the hue values at the vertically and horizontally adjacent pixels.

A first recording medium has an interpolation processing program recorded therein to implement on a computer processing for determining an interpolation value equivalent to color information corresponding to a first color component missing at a pixel, on image data provided in a calorimetric system constituted of first~nth ($n \geq 2$) color components with color information corresponding to a single color component present at each pixel. The interpolation processing program comprises: an interpolation value calculation step in which an interpolation value including, at least (1) local average information of the first color component with regard to an interpolation target pixel to undergo interpolation processing and (2) local curvature information corresponding to at least two color components with regard to the interpolation target pixel, is calculated by using color information provided at pixels set within a local area containing the interpolation target pixel.

Namely, through the interpolation processing program recorded at the first recording medium, the interpolation value is calculated by correcting the "local average information of the first color component with regard to the interpolation target pixel" with the "local curvature information corresponding to at least two color components with regard to the interpolation target pixel."

A second recording medium has an interpolation processing program recorded therein to implement on a computer processing for determining an interpolation value equivalent to color information corresponding to a first color component missing at a pixel, on image data provided in a calorimetric system constituted of first~nth (n≧2) color components with color information corresponding to a single color component present at each pixel. The interpolation processing program comprises: an interpolation value calculation step in which an interpolation value including, at least (1) local average information of the first color component with regard to an interpolation target pixel to undergo the interpolation processing; and (2) local curvature information based upon a color component other than a color component at the interpolation target pixel, is calculated by using color information provided at pixels set within a local area containing the interpolation target pixel.

Namely, through the interpolation processing program recorded at the second recording medium, the interpolation value is calculated by correcting the "local average information of the first color component with regard to the interpolation target pixel" with the "local curvature information based upon a color component other than the color component at the interpolation target pixel."

A third recording medium has an interpolation processing program recorded therein to implement on a computer processing for determining an interpolation value equivalent to color information corresponding to a first color component missing at a pixel, on image data provided in a calorimetric system constituted of first~nth (n≧2) color components with color information corresponding to a single color component present at each pixel. The interpolation processing program comprises: an interpolation value calculation step in which an interpolation value including, at least (1) local average information of the first color component with regard to an interpolation target pixel to undergo the interpolation processing, and (2) local curvature information corresponding to the first color component with respect to the interpolation target pixel, is calculated by using color information provided at pixels set within a local area containing the interpolation target pixel.

Namely, through the interpolation processing program recorded at the third recording medium, the interpolation value is calculated by correcting the "local average information of the first color component with regard to the interpolation target pixel" with the "local curvature information corresponding to the first color component with respect to the interpolation target pixel."

A fourth recording medium has an interpolation processing program recorded therein to implement on a computer processing for determining an interpolation value equivalent to color information corresponding to a first color component missing at a pixel, on image data provided in a colorimetric system constituted of first~nth (n≧2) color components with color information corresponding to a single color component present at each pixel. The interpolation processing program comprises: an interpolation value calculation step in which an interpolation value including at least two terms, i.e., a first term and a second term is calculated by using color information at pixels set within a local area containing an interpolation target pixel to undergo interpolation processing; a first similarity judgment step in which degrees of similarity to the interpolation target pixel are judged along at least two directions in which pixels having color information corresponding to the first color component are connected with the interpolation target pixel; and a second similarity judgment step in which degrees of similarity to the interpolation target pixel are judged along at least two directions other than the directions along which the degrees of similarity are judged in the first similarity judgment step, wherein: in the interpolation value calculation step, a direction in which pixels having color information to be used to calculate the first term are set is selected based upon results of a judgment made in the first similarity judgment step and a direction in which pixels having color information to be used to calculate the second term are set is selected based upon results of a judgment made in the second similarity judgment step.

In other words, since the directions along which similarity is judged in the second similarity judging step are different from the directions in which similarity is judged in the first similarity judging step in the interpolation processing program recorded at the fourth recording medium, color information from pixels located along more diverse directions including a direction along which the color information used to calculate the second term is provided as well as a direction along which the color information used to calculate the first term is provided can be used in the processing.

A fifth recording medium has an interpolation processing program recorded therein to implement on a computer processing for determining an interpolation value equivalent to color information corresponding to a first color component missing at a pixel, on image data provided in a calorimetric system constituted of first~nth (n≧2) color components with color information corresponding to a single color component present at each pixel. The interpolation processing program comprises: a first term calculation step in which a first term representing average information of the first color component with regard to an interpolation target pixel to undergo interpolation processing is calculated by using color information corresponding to a color component at pixels set within a local area containing the interpolation target pixel; a second term calculation step in which a second term representing local curvature information based upon a color component matching the color component at the interpolation target pixel is calculated with regard to the interpolation target pixel by using color information corresponding to a color component at pixels set within a local area containing the interpolation target pixel; and an interpolation value calculation step in which an interpolation value is calculated by adding the second term multiplied by a weighting coefficient constituted of color information corresponding to a plurality of color components provided at pixels set within a local area containing the interpolation target pixel to the first term.

Namely, through the interpolation processing program recorded at the fifth recording medium, the interpolation value is calculated by correcting the "average information of the first color component with regard to the interpolation target pixel" with the "local curvature information based upon a color component matching the color component at the interpolation target pixel with regard to the interpolation target pixel" multiplied by a weighting coefficient constituted of color information corresponding to a plurality of color components at the interpolation target pixel and at pixels located in the local area containing the interpolation target pixel.

A sixth recording medium has an interpolation processing program recorded therein for implementing on a computer processing supplementing a color component value at a pixel at which information corresponding to a color component is missing, on image data provided in a colorimetric system constituted of a luminance component and the color component, with the luminance component having a higher spatial frequency than the color component and the luminance component present both at pixels having information corresponding to the color component and at pixels lacking information corresponding to the color component. The interpolation processing program comprises: a hue value calculation step in which hue values for a plurality of pixels near an interpolation target pixel to undergo interpolation processing and having information corresponding to both the luminance component and the color component are calculated by using luminance component values and color component values at the individual pixels; a hue value interpolation step in which a hue value for the interpolation target pixel is calculated by using a median of the hue values at the plurality of pixels calculated in the hue value calculation step; and a color conversion step in which a color component value at the interpolation target pixel is interpolated by using a value indicated by the luminance component present at the interpolation target pixel to convert the hue value of the interpolation target pixel calculated in the hue value interpolation step to a color component value.

Namely, through the interpolation processing program recorded at the sixth recording medium, the hue value of the interpolation target pixel is calculated by using the median of the hue values at a plurality of pixels present near the interpolation target pixel.

A seventh recording medium has an interpolation processing program recorded therein for implementing on a computer processing for supplementing a luminance component value at a pixel at which information corresponding to a luminance component is missing and a color component value at a pixel at which information corresponding to a color component missing, on image data provided in a calorimetric system constituted of the luminance component and the color component, with the luminance component having a higher spatial frequency than the color component and information corresponding to either the luminance component or the color component present at each pixel. The interpolation processing program comprises: a luminance component interpolation step in which a luminance component value is interpolated for a luminance component interpolation target pixel to undergo luminance component interpolation processing by using at least either "similarity between the luminance component interpolation target pixel and a pixel near the luminance component interpolation target pixel" or "information corresponding to a plurality of color components within a local area containing the luminance component interpolation target pixel"; a hue value calculation step in which hue values at a plurality of pixels located near an interpolation target pixel to undergo color component interpolation processing, having color component values and having luminance component values interpolated in the luminance component interpolation step are calculated by using the luminance component values and color component values at the individual pixels; a hue value interpolation step in which a hue value for the interpolation target pixel is calculated by using a median of the hue values at the plurality of pixels calculated in the hue value calculation step; and a color conversion step in which a color component value is interpolated for the interpolation target pixel by using the luminance component value at the interpolation target pixel to convert the hue value at the interpolation target pixel calculated in the hue value interpolation step to a color component value.

Namely, through the interpolation processing program recorded at the seventh recording medium, the hue value of the interpolation target pixel is calculated by using the median of the hue values at a plurality of pixels present near the interpolation target pixel.

It is to be noted that by adopting the interpolation processing programs at the first~seventh recording media, the first, third, fourth, sixth, 15th, 17th and 19th interpolation processing apparatuses may be realized on a computer. Likewise, the second, fifth, seventh~14th, 16th, 18th, and 20th~22nd interpolation processing apparatuses may be realized through interpolation processing programs recorded at recording media. These interpolation processing programs may be provided to a computer through a communication line such as the Internet.

BRIEF DESCRIPTION OF THE DRAWINGS

FIG. 1 is a functional block diagram of an electronic camera corresponding to first through fifth embodiments;

FIGS. 2A and 2B show the arrangements of the color components in the image data adopted in the first embodiment, the second embodiment and the fourth embodiment;

FIGS. 3A and 3B show the arrangements of the color components in the image data adopted in the third embodiment and the fifth embodiment;

FIG. 4 is a flowchart (1) of the operation achieved at the interpolation processing unit in the first embodiment;

FIGS. 6A and 6B illustrate methods of weighted addition of similarity degree components;

FIG. 7 shows the directions along which marked similarity manifests in correspondence to values (HV[i,j], DN[i,j]);

FIG. 8 shows the positions of the color information used to calculate the green color interpolation value G[i,j];

FIGS. 10A~10C illustrate median processing of the prior art;

FIGS. 11A and 11B illustrate the median processing operation achieved in the first embodiment;

FIGS. 12A and 12B illustrate the ranges of the median processing implemented in the first embodiment;

FIG. 13 shows the positions of the color information used to calculate local curvature information;

FIG. 14 (continued from FIG. 13) shows the positions of the color information used to calculate local curvature information;

FIGS. 19A~19C illustrate over correction occurring due to magnification chromatic aberration.

DESCRIPTION OF THE PREFERRED EMBODIMENTS

Figure 5:
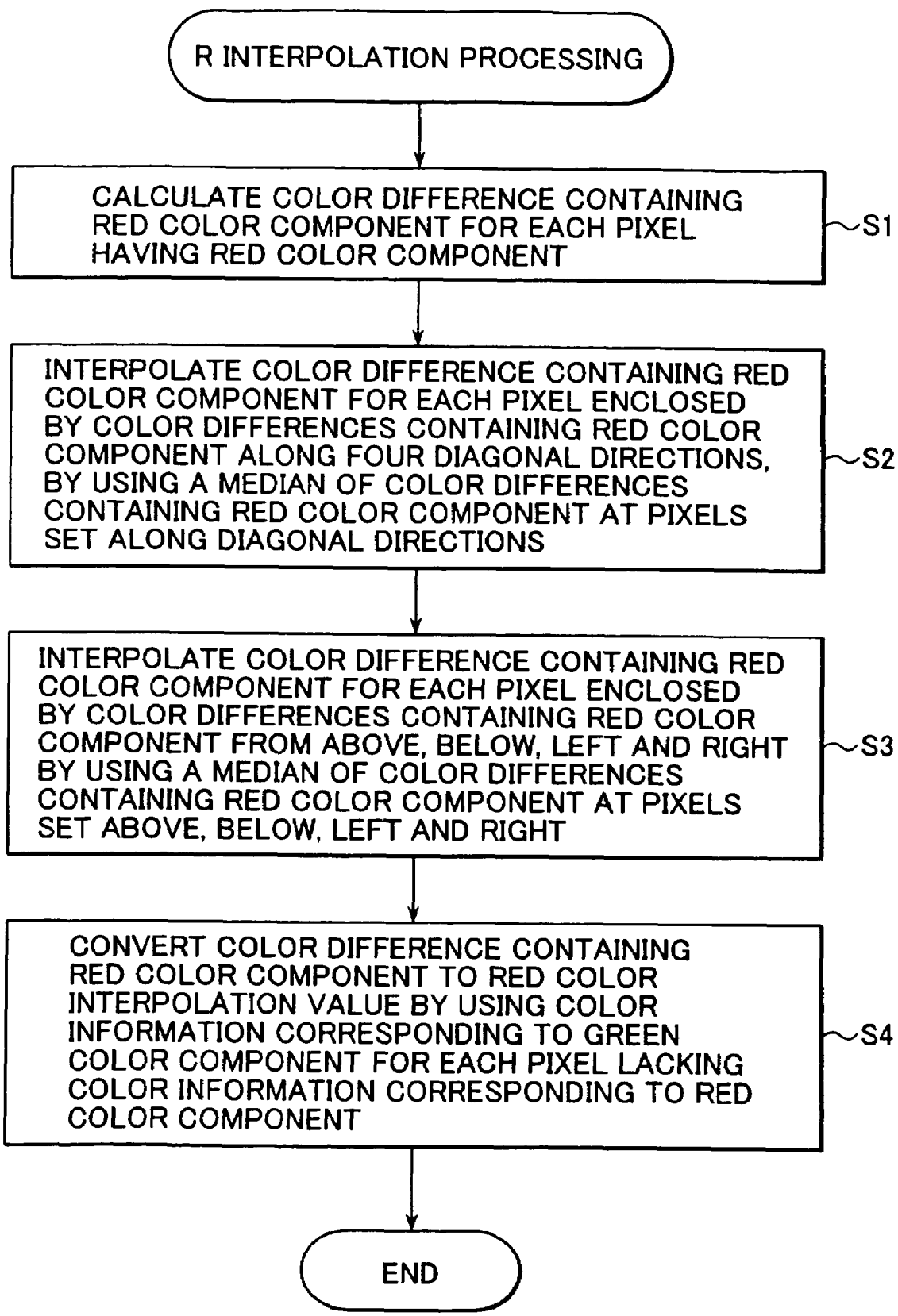
FIG. 5 is a flowchart (2) of the operation achieved at the interpolation processing unit in the first embodiment.

The following is a detailed explanation of the embodiments of the present invention, given in reference to the drawings. FIG. 1 is a functional block diagram of the electronic camera corresponding to the first through fifth embodiments.

In FIG. 1, an electronic camera 10 comprises a control unit 11, a photographic optical system 12, an image-capturing unit 13, an A/D conversion unit 14, an image processing unit 15 and a recording unit 16. The image processing unit 15 is provided with an interpolation processing unit (e.g., a one-chip microprocessor dedicated to interpolation processing). The image-capturing unit 13 is provided with an image-capturing sensor (not shown) constituted by arranging R, G and B color filters in a Bayer array.

It is to be noted that while FIG. 1 shows only the interpolation processing unit 17 in the image processing unit 15 to simplify the illustration, a functional block that engages in other image processing such as gradation conversion processing may also be provided in the image processing unit 15.

In FIG. 1, the control unit 11 is connected to the image-capturing unit 13, the A/D conversion unit 14, the image processing unit 15 and the recording unit 16. In addition, an optical image obtained at the photographic optical system 12 is formed at the image-capturing sensor in the image-capturing unit 13. An output from the image-capturing unit 13 is quantized at the A/D conversion unit 14 and is provided to the image processing unit 15 as image data. The image data provided to the image processing unit 15 undergo interpolation processing at the interpolation processing unit 17 and after having undergone image compression as necessary, they are recorded via the recording unit 16. The image data with the degrees of resolution corresponding to the individual color components improved through the interpolation processing are ultimately output as image data in a calorimetric system that corresponds to the type of device that is connected, such as a display or a printer.

FIGS. 2A and 2B show the arrangements of the color components in the image data adopted in the first embodiment, the second embodiment and the fourth embodiment, and FIGS. 3A and 3B show the arrangements of the color components in the image data adopted in the third embodiment and the fifth embodiment. It is to be noted that in FIGS. 2A and 2B and in FIGS. 3A and 3B, the individual color components are indicated as R, G and B, with the positions of pixels at which the various color components are present indicated with i and j.

With [i,j] indicating the coordinates of an interpolation target pixel to undergo the interpolation processing, FIGS. 2A and 2B each show the arrangement of 7×7 pixels with the interpolation target pixel at the center, whereas FIGS. 3A and 3B each show the arrangement of 5×5 pixels with the interpolation target pixel at the center. In addition, FIGS. 2A and 3A each show an arrangement of pixels among which a pixel with the red color component is to undergo the interpolation processing, and FIGS. 2B and 3B each show an arrangement of pixels among which a pixel with the blue color component is to undergo the interpolation processing.

In the various embodiments to be detailed later, the interpolation processing unit 17 first implements the interpolation processing to supplement the green color interpolation values for pixels at which the green color component is missing (hereafter referred to as "G interpolation processing") and then engages in interpolation processing through which red color interpolation values and blue color interpolation values are supplemented at pixels at which the red color component and the blue color component are missing (hereafter referred to as "RB interpolation processing"). However, since the interpolation processing implemented to supplement blue color interpolation values (hereafter referred to as "B interpolation processing") is implemented in a manner identical to the manner with which the interpolation processing for supplementing red color interpolation values (hereafter referred to as "R interpolation processing") is implemented, its explanation is omitted.

In addition, it is assumed that the pixel at coordinates [i,j] is the interpolation target pixel to undergo the G interpolation processing, to simplify the subsequent explanation. Since the green color interpolation value can be calculated through the G interpolation processing in each of the embodiments explained below regardless of the color component (red or blue) at the interpolation target pixel, R and B in FIGS. 2A and 2B and FIGS. 3A and 3B are all replaced with Z with the color information at the interpolation target pixel expressed as Z[i,j] and color information at other pixels also expressed in a similar manner in the following explanation.

First Embodiment

FIGS. 4 and 5 present a flowchart of the operation achieved in the interpolation processing unit 17 in the first embodiment, with FIG. 4 corresponding to the operation of the interpolation processing unit 17 during the G interpolation processing and FIG. 5 corresponding to the operation of the interpolation processing unit 17 during the R interpolation processing.

The explanation of the operation achieved in the first embodiment given below focuses on the operation of the interpolation processing unit 17 by referring to FIGS. 4 and 5.

First, the interpolation processing unit 17 calculates a similarity degree Cv[i,j] along the vertical direction and a similarity degree Ch[i,j] along the horizontal direction for an interpolation target pixel at which the green component is missing (FIG. 4 S1).

Now, the details of the processing implemented to calculate the vertical similarity degree Cv[i,j] and the horizontal similarity degree Ch[i,j] in the first embodiment are explained.

The interpolation processing unit 17 first calculates a plurality of types of similarity degree components along the vertical direction and the horizontal direction defined through the following formulae 10~21.

G-G similarity degree component along vertical direction:

$$Cv1[i,j]=|G[i,j-1]-G[i,j+1]| \qquad \text{formula 10}$$

G-G similarity degree component along horizontal direction:

$$Ch1[i,j]=|G[i-1,j]-G[i+1,j]| \qquad \text{formula 11}$$

B-B (R-R) similarity degree component along vertical direction:

$$Cv2[i,j]=(|Z[i-1,j-1]-Z[i-1,j+1]|+|Z[i+1,j-1]-Z[i+1,j+1]|)/2 \qquad \text{formula 12}$$

B-B (R-R) similarity degree component along horizontal direction:

$$Ch2[i,j]=(|Z[i-1,j-1]-Z[i+1,j-1]|+|Z[i-1,j+1]-Z[i+1,j+1]|)/2 \qquad \text{formula 13}$$

R-R (B-B) similarity degree component along vertical direction:

$$Cv3[i,j]=(|Z[i,j-2]-Z[i,j]|+|Z[i,j+2]-Z[i,j]|)/2 \qquad \text{formula 14}$$

R-R (B-B) similarity degree component along horizontal direction:

$$Ch3[i,j]=(|Z[i-2,j]-Z[i,j]|+|Z[i+2,j]-Z[i,j]|)/2 \quad \text{formula 15}$$

G-R (G-B) similarity degree component along vertical direction:

$$Cv4[i,j]=(|G[i,j-1]-Z[i,j]|+|G[i,j+1]-Z[i,j]|)/2 \quad \text{formula 16}$$

G-R (G-B) similarity degree component along horizontal direction:

$$Ch4[i,j]=(|G[i-1,j]-Z[i,j]|+|G[i+1,j]-Z[i,j]|)/2 \quad \text{formula 17}$$

B-G (R-G) similarity degree component along vertical direction:

$$Cv5[i,j]=(|Z[i-1,j-1]-G[i-1,j]|+|Z[i-1,j+1]-G[i-1,j]| \\ +|Z[i+1,j-1]-G[i+1,j]|+|Z[i+1,j+1]-G[i+1,j]|)/4 \quad \text{formula 18}$$

B-G (R-G) similarity degree component along horizontal direction:

$$Ch5[i,j]=(|Z[i-1,j-1]-G[i,j-1]|+|Z[i-1,j+1]-G[i,j+1]| \\ +|Z[i+1,j-1]-G[i,j-1]|+|Z[i+1,j+1]-G[i,j+1]|)/4 \quad \text{formula 19}$$

luminance similarity degree component along vertical direction:

$$Cv6[i,j]=(|Y[i,j-1]-Y[i,j]|+|Y[i,j+1]-Y[i,j]|)/2 \quad \text{formula 20}$$

luminance similarity degree component along horizontal direction:

$$Ch6[i,j]=(|Y[i-1,j]-Y[i,j]|+|Y[i+1,j]-Y[i,j]|)/2 \quad \text{formula 21}$$

In formulae 20 and 21, Y[i,j] represents a value calculated through $$Y[i,j]=(4\cdot A[i,j]+2\cdot(A[i,j-1]+A[i,j+1]+A[i-1,j]+A[i+1,j])+A[i-1,j-1]+A[i-1,j+1]+A[i+1,j-1]+A[i+1,j+1])/16 \quad \text{formula 22}$$

which is equivalent to the luminance value generated through filtering processing in which the color information corresponding to the color components at nearby pixels around the interpolation target pixel is averaged at a ratio of R:G:B=1:2:1. It is to be noted that A[i,j] represents an arbitrary set of color information on the Bayer array which may assume a G value or a Z value depending upon the position at which the color information is provided.

Next, the interpolation processing unit 17 performs weighted addition of the plurality of types of similarity degree components along each direction by using weighting coefficients a1, a2, a3, a4, a5 and a6, as expressed in the follow formulae 23 and 24, to calculate a similarity degree Cv0[i,j] along the vertical direction and a similarity degree Ch0[i,j] along the horizontal direction for the interpolation target pixel.

$$Cv0[i,j] = \\ (a1\cdot Cv1[i,j]+a2\cdot Cv2[i,j]+a3\cdot Cv3[i,j]+a4\cdot Cv4[i,j]+ \\ a5\cdot Cv5[i,j]+a6\cdot Cv6[i,j])/ \\ (a1+a2+a3+a4+a5+a6) \quad \text{formula 23}$$

$$Ch0[i,j] = (a1\cdot Ch1[i,j]+a2\cdot Ch2[i,j]+a3\cdot Ch3[i,j]+ \\ a4\cdot Ch4[i,j]+a5\cdot Ch5[i,j]+a6\cdot Ch6[i,j])/ \\ (a1+a2+a3+a4+a5+a6) \quad \text{formula 24}$$

In the first embodiment, a further improvement is achieved in the accuracy with which the similarity degrees are calculated by calculating the similarity degree components along the vertical and horizontal directions and performing weighted addition of the similarity degree components for nearby pixels around the interpolation target pixel as well as for the interpolation target pixel.

Namely, the interpolation processing unit 17 performs weighted addition of the results obtained by implementing weighted addition of the similarity degree components at the interpolation target pixel and the nearby pixels (Cv0[i,j], Cv0[i−1,j−1], Cv0[i−1,j+1], Cv0[i+1,j−1], Cv0[i+1,j+1] and the like), through either (method 1) or (method 2) detailed below, to obtain a similarity degree Cv[i,j] along the vertical direction and a similarity degree Ch[i,j] along the horizontal direction manifesting by the interpolation target pixel.

(Method 1)

$$Cv[i,j]=(4\cdot Cv0[i,j]+Cv0[i-1,j-1]+Cv0[i-1,j+1]+Cv0[i+1,j-1]+Cv0[i+1,j+1])/8 \quad \text{formula 25}$$

$$Ch[i,j]=(4\cdot Ch0[i,j]+Ch0[i-1,j-1]+Ch0[i-1,j+1]+Ch0[i+1,j-1]+Ch0[i+1,j+1])/8 \quad \text{formula 26}$$

(Method 2)

$$Cv[i,j] = \\ (4\cdot Cv0[i,j]+2\cdot(Cv0[i-1,j-1]+Cv0[i+1,j-1]+ \\ Cv0[i-1,j+1]+Cv0[i+1,j+1])+ \\ Cv0[i,j-2]+Cv0[i,j+2]+Cv0[i-2,j]+ \\ Cv0[i+2,j])/16 \quad \text{formula 27}$$

$$Ch[i,j] = \\ (4\cdot Ch0[i,j]+2\cdot(Ch0[i-1,j-1]+Ch0[i+1,j-1]+ \\ Ch0[i-1,j+1]+Ch0[i+1,j+1])+ \\ Ch0[i,j-2]+Ch0[i,j+2]+Ch0[i-2,j]+ \\ Ch0[i+2,j])/16 \quad \text{formula 28}$$

It is to be noted that while (method 1) corresponds to that weighted addition of the similarity degree components at the interpolation target pixel and the nearby pixels is implemented as illustrated in FIG. 6A, (method 2) corresponds to that weighted addition of the similarity degree components at the interpolation target pixel and the nearby pixels is implemented as illustrated in FIG. 6B.

The similarity degree components each calculated by using color information corresponding to the same color component such as the G-G similarity degree components, B-B (R-R) similarity degree component and the R-R (B-B) similarity degree components (hereafter referred to as "same-color similarity degree components") have been confirmed through testing to be suitable for use in the evaluation of similarity manifesting in an image with a low spatial frequency and a large colored area. The similarity degree components each calculated by using color information corresponding to different color components such as the G-R (G-B) similarity degree components and B-G (R-G) similarity degree components (hereafter referred to as "different-color similarity degree components") have been confirmed through testing to be suitable for use in the evaluation of similarity manifesting in an image with a high spatial frequency and a large achromatic image area. In addition, the luminance similarity degree components have been confirmed through testing to be suitable for use in the evaluation of similarity manifesting in an image containing both a colored area and an image area with a fairly high spatial frequency.

In other words, the evaluation of similarity manifesting in various types of images can be achieved with a high degree of accuracy by using similarity degrees obtained through weighted addition of same-color similarity degree components, different-color similarity degree components and luminance similarity degree components.

In addition, the functions of the three types of similarity degree components calculated as the same-color similarity degree components (the G-G similarity degree components, the B-B (R-R) similarity degree components and the R-R (B-B) similarity degree components) in the similarity evaluation can be complemented by one another and the functions of the two types of similarity degrees components calculated as the different-color similarity degree components (the G-R (G-B) similarity degree components and the B-G (R-G) similarity degree components) in the similarity evaluation, too, can be complemented by each other.

Furthermore, in the first embodiment, the vertical similarity degree Cv[i,j] and the horizontal similarity degree Ch[i,j] are calculated through weighted addition of the results of weighted addition of similarity degree components at the interpolation target pixel and the results of weighted addition of similarity degree components at nearby pixels. Thus, the continuity between the color information at the interpolation target pixel and the color information at the pixels located near the interpolation target pixel is readily reflected in the vertical similarity degree Cv[i,j] and the horizontal similarity degree Ch[i,j].

In particular, the vertical similarity degree Cv[i,j] and the horizontal similarity degree Ch[i,j] calculated through (method 2) reflect color information corresponding to the color components at pixels over a wide range and thus, are effective in the similarity evaluation of an image manifesting a pronounced magnification chromatic aberration.

It is to be noted that the vertical similarity degree Cv[i,j] and the horizontal similarity degree Ch[i,j] in the first embodiment indicate more marked similarity as their values become smaller.

After the vertical similarity degree Cv[i,j] and the horizontal similarity degree Ch[i,j] are calculated as described above, the interpolation processing unit 17 compares the similarity along the vertical direction and the similarity along the horizontal direction manifesting at the interpolation target pixel (hereafter referred to as the "vertical/horizontal similarity") based upon the vertical similarity degree Cv[i,j] and the horizontal similarity degree Ch[i,j] (FIG. 4 S2). Then, it sets one of the following values for an index HV[i,j] which indicates the vertical/horizontal similarity based upon the results of the comparison.

For instance, if |Cv[i,j]−Ch[i,j]|>T1 and Cv[i,j]<Ch[i,j] are true with regard to a given threshold value T1, the interpolation processing unit 17 judges that a more marked similarity is manifested along the vertical direction than along the horizontal direction and sets 1 for the index HV[i,j] (FIG. 4 S3), if; |Cv[i,j]−Ch[i,j]|>T1 and Cv[i,j]>Ch[i,j] are true, the interpolation processing unit 17 judges that a more marked similarity is manifested along the horizontal direction than along the vertical direction and sets −1 for the index HV[i,j] (FIG. 4 S4) and if; |Cv[i,j]−Ch[i,j]|≦T1 is true, the interpolation processing unit 17 judges that the degree of similarity manifested along the horizontal direction and along the vertical direction are essentially the same and sets 0 for the index HV[i,j] (FIG. 4 S5).

It is to be noted that the threshold value T1 is used to prevent an erroneous judgment that the similarity along either direction is more marked from being made due to noise when the difference between the vertical similarity degree Cv[i,j] and the horizontal similarity degree Ch[i,j] is very little. Accordingly, by setting a high value for the threshold value T1 when processing a color image with a great deal of noise, an improvement in the accuracy of the vertical/horizontal similarity judgment is achieved.

Next, the interpolation processing unit 17 calculates a similarity degree C45[i,j] along the diagonal 45° direction and a similarity degree C135[i,j] along the diagonal 135° degree direction for the interpolation target pixel (FIG. 4 S6).

Now, details of the processing implemented in the first embodiment to calculate the diagonal 45° similarity degree C45[i,j] and the diagonal 135° similarity degree C135[i,j] are explained.

First, the interpolation processing unit 17 calculates a plurality of types of similarity degree components along the diagonal 45° direction and the diagonal 135° direction as defined in the following formulae 29~36;

G-G similarity degree component along the diagonal 45° direction:

$$C45\_1[i,j]=(|G[i,j-1]-G[i-1,j]|+|G[i+1,j]-G[i,j+1]|)/2 \quad \text{formula 29}$$

G-G similarity degree component along the diagonal 135° direction:

$$C135\_1[i,j]=(|G[i,j-1]-G[i+1,j]|+|G[i-1,j]-G[i,j+1]|)/2 \quad \text{formula 30}$$

B-B (R-R) similarity degree component along the diagonal 45° direction:

$$C45\_2[i,j]=|Z[i+1,j-1]-Z[i-1,j+1]| \quad \text{formula 31}$$

B-B (R-R) similarity degree component along the diagonal 135° direction:

$$C135\_2[i,j]=|Z[i-1,j-1]-Z[i+1,j+1]| \quad \text{formula 32}$$

R-R (B-B) similarity degree component along the diagonal 45° direction:

$$C45\_3[i,j]=(|Z[i+2,j-2]-Z[i,j]|+|Z[i-2,j+2]-Z[i,j]|)/2 \quad \text{formula 33}$$

R-R (B-B) similarity degree component along the diagonal 135° direction:

$$C135\_3[i,j]=(|Z[i-2,j-2]-Z[i,j]|+|Z[i+2,j+2]-Z[i,j]|)/2 \quad \text{formula 34;}$$

B-R (R-B) similarity degree component along the diagonal 45° direction:

$$C45\_4[i,j]=(|Z[i+1,j-1]-Z[i,j]|+|Z[i-1,j+1]-Z[i,j]|)/2 \quad \text{formula 35}$$

B-R (R-B) similarity degree component along the diagonal 135° direction:

$$C135\_4[i,j]=(|Z[i-1,j-1]-Z[i,j]|+|Z[i+1,j+1]-Z[i,j]|)/2 \quad \text{formula 36;}$$

Next, the interpolation processing unit 17 calculates a similarity degree C45_0[i,j] along the diagonal 45° direction and a similarity degree C135_0[i,j] along the diagonal 135° direction through weighted addition of the plurality of types of similarity degree components performed along each of the two directions by using weighting coefficients b1, b2, b3 and b4, as expressed in the following formulae 37 and 38.

$$C45\_0[i,j]=(b1 \cdot C45\_1[i,j]+b2 \cdot C45\_2[i,j]+b3 \cdot C45\_3[i,j]+b4 \cdot C45\_4[i,j])/(b1+b2+b3+b4) \quad \text{formula 37}$$

$$C135\_0[i,j]=(b1 \cdot C135\_1[i,j]+b2 \cdot C135\_2[i,j]+b3 \cdot C135\_3[i,j]+b4 \cdot C135\_4[i,j])/(b1+b2+b3+b4) \quad \text{formula 38}$$

It is to be noted that the ratio of the weighting coefficients b1, b2, b3 and b4 in formulae 37 and 38 may be, for instance, "b1:b2:b3:b4:=2:1:1:2."

In the first embodiment, a further improvement is achieved in the accuracy with which the similarity degrees are calculated by calculating the similarity degree components along the diagonal 45° direction and the diagonal 135° direction and performing weighted addition of the similarity degree components for nearby pixels around the interpolation target pixel as well as for the interpolation target pixel.

Namely, the interpolation processing unit 17 performs weighted addition of the results obtained by implementing weighted addition of the similarity degree components at the interpolation target pixel and the nearby pixels (C45_0[i,j], C45_0[i−1,j−1], C45_0[i−1,j+1], C45_0[i+1,j−1], C45_0[i+1,j+1] and the like) through either (method 1) or (method 2) detailed below, to obtain a similarity degree C45[i,j] along the diagonal 45° direction and a similarity degree C135[i,j] along the diagonal 135° direction manifesting by the interpolation target pixel (equivalent to implementing weighted addition of similarity degree components at the interpolation target pixel and the nearby pixels as illustrated in FIGS. 6A and 6B).

(Method 1)

$$C45[i,j]=(4\cdot C45\_0[i,j]+C45\_0[i-1,j-1]+C45\_0[i+1,j-1]+C45\_0[i-1,j+1]+C45\_0[i+1,j+1])/8 \quad \text{formula 39}$$

$$C135[i,j]=(4\cdot C135\_0[i,j]+C135\_0[i-1,j-1]+C135\_0[i+1,j-1]+C135\_0[i-1,j+1]+C135\_0[i+1,j+1])/8 \quad \text{formula 40}$$

(Method 2)

$$C45[i,j] = (4\cdot C45\_0[i,j] + \\ 2\cdot(C45\_0[i-1,j-1]+C45\_0[i+1,j-1]+ \\ C45\_0[i-1,j+1]+C45\_0[i+1,j+1]) + \\ C45\_0[i,j-2]+C45\_0[i,j+2]+ \\ C45\_0[i-2,j]+C45\_0[i+2,j])/16 \quad \text{formula 41}$$

$$C135[i,j] = (4\cdot C135\_0[i,j] + \\ 2\cdot(C135\_0[i-1,j-1]+C135\_0[i+1,j-1]+ \\ C135\_0[i-1,j+1]+C135\_0[i+1,j+1]) + \\ C135\_0[i,j-2]+C135\_0[i,j+2]+ \\ C135\_0[i-2,j]+C135\_0[i+2,j])/16 \quad \text{formula 42}$$

It is to be noted that the weighted addition of the plurality of similarity degree components and the consideration of the evaluation of similarity degrees at the nearby pixels with regard to the diagonal 45° similarity degree C45[i,j] and the diagonal 135° similarity degree C135[i,j] thus calculated achieves the same function as that with regard to the vertical similarity degree Cv[i,j] and the horizontal similarity degree Ch[i,j]. In addition, the diagonal 45° similarity degree C45[i,j] and the diagonal 135° similarity degree C135[i,j] in the first embodiment indicate more marked similarity as their values become smaller.

After the diagonal 45° similarity degree C45[i,j] and the diagonal 135° similarity degree C135[i,j] are calculated, the interpolation processing unit 17 compares the similarity along the diagonal 45° direction and the similarity along the diagonal 135° direction manifesting at the interpolation target pixel (hereafter referred to as the "diagonal similarity") based upon the diagonal 45° similarity degree C45[i,j] and the diagonal 135° similarity degree C135[i,j] (FIG. 4 S7). Then, it sets one of the following values for an index DN[i,j] which indicates the diagonal similarity based upon the results of the comparison.

For instance, if; |C45[i,j]−C135[i,j]|>T2 and C45[i,j]<C135[i,j] are true with regard to a given threshold value T2, the interpolation processing unit 17 judges that a more marked similarity is manifested along the diagonal 45° direction than along the diagonal 135° direction and sets 1 for the index DN[i,j] (FIG. 4 S8), if; |C45[i,j]−C135[i,j]|>T2 and C45[i,j]>C135[i,j] are true, the interpolation processing unit 17 judges that a more marked similarity is manifested along the diagonal 135° direction than along the diagonal 45° direction and sets −1 for the index DN[i,j] (FIG. 4 S9) and if; |C45[i,j]−C135[i,j]|≦T2 is true, the interpolation processing unit 17 judges that the degree of similarity manifesting along the diagonal 45° direction and along the diagonal 135° direction are essentially the same and sets 0 for the index DN[i,j] (FIG. 4 S10).

It is to be noted that the threshold value T2 is used to prevent an erroneous judgment that the similarity along either direction is more marked from being made due to noise.

Next, the interpolation processing unit 17 ascertains the specific values of the index HV[i,j] indicating the vertical/horizontal similarity and the index DN[i,j] indicating the diagonal similarity (FIG. 4 S11) and classifies the class of the similarity manifesting at the interpolation target pixel as one of the following; case 1~case 9.

case 1: (HV[i,j], DN[i,j])=(1, 1): marked similarity manifesting along the vertical direction and the diagonal 45° direction case 2: (HV[i,j], DN[i,j])=(1, 0): marked similarity manifesting along the vertical direction case 3: (HV[i,j], DN[i,j])=(1, −1): marked similarity manifesting along the vertical direction and the diagonal 135° direction case 4: (HV[i,j], DN[i,j])=(0, 1): marked similarity manifesting along the diagonal 45° direction case 5: (HV[i,j], DN[i,j])=(0, 0): marked similarity manifesting along all the directions or little similarity manifesting along all the directions case 6: (HV[i,j], DN[i,j])=(0, −1): marked similarity manifesting along the diagonal 135° direction case 7: (HV[i,j], DN[i,j])=(−1, 1): marked similarity manifesting along the horizontal direction and the diagonal 45° direction case 8: (HV[i,j], DN[i,j])=(−1, 0): marked similarity manifesting along the horizontal direction case 9: (HV[i,j], DN[i,j])=(−1, −1): marked similarity manifesting along the horizontal direction and the diagonal 135° direction.

FIG. 7 illustrates the directions along which marked similarity manifests, as indicated by the values of HV[i,j], DN[i,j]

In FIG. 7, there is no directional indication that corresponds to "case 5: (HV[i,j], DN[i,j]),=(0, 0)." A marked similarity manifesting along all the directions or only a slight similarity manifesting along all the directions as in case 5 means that the interpolation target pixel is contained within a flat area or is an isolated point (an image area manifesting a lower degree of similarity to nearby pixels and having a high spatial frequency).

Next, the interpolation processing unit 17 calculates the green color interpolation value G[i,j] as indicated below based upon the results of the judgment explained above.

In case 1, G[i,j]=Gv45[i,j]: FIG. 4 S12
In case 2, G[i,j]=Gv[i,j]: FIG. 4 S13
In case 3, G[i,j]=Gv135[i,j]: FIG. 4 S14

In case 4, G[i,j]=(Gv45[i,j]+Gh45[i,j])/2: FIG. 4 S15
In case 5, G[i,j]=(Gv[i,j]+Gh[i,j])/2: FIG. 4 S16
In case 6, G[i,j]=(Gv135[i,j]+Gh135[i,j])/2: FIG. 4 S17
In case 7, G[i,j]=Gh45[i,j]: FIG. 4 S18
In case 8, G[i,j]=Gh[i,j]: FIG. 4 S19
In case 9, G[i,j]=Gh135[i,j]: FIG. 4 S20, with $$Gv[i, j] = (G[i, j-1] + G[i, j+1])/2 + \\ (2 \cdot Z[i, j] - Z[i, j-2] - Z[i, j+2])/8 + \\ (2 \cdot G[i-1, j] - G[i-1, j-2] - G[i-1, j+2] + \\ 2 \cdot G[i+1, j] - G[i+1, j-2] - G[i+1, j+2])/16$$ formula 43

$$Gv45[i, j] = (G[i, j-1] + G[i, j+1])/2 + \\ (2 \cdot Z[i, j] - Z[i, j-2] - Z[i, j+2])/8 + \\ (2 \cdot Z[i-1, j+1] - Z[i-1, j-1] - Z[i-1, j+3] + \\ 2 \cdot Z[i+1, j-1] - Z[i+1, j-3] - Z[i+1, j+1])/16$$ formula 44

$$Gv135[i, j] = (G[i, j-1] + G[i, j+1])/2 + \\ (2 \cdot Z[i, j] - Z[i, j-2] - Z[i, j+2])/8 + \\ (2 \cdot Z[i-1, j-1] - Z[i-1, j-3] - Z[i-1, j+1] + \\ 2 \cdot z[i+1, j+1] - Z[i+1, j-1] - Z[i+1, j+3])/16$$ formula 45

$$Gh[i, j] = (G[i-1, j] + G[i+1, j])/2 + \\ (2 \cdot Z[i, j] - Z[i-2, j] - Z[i+2, j])/8 + \\ (2 \cdot G[i, j-1] - G[i-2, j-1] - G[i+2, j-1] + \\ 2 \cdot G[i, j+1] - G[i-2, j+1] - G[i+2, j+1])/16$$ formula 46

$$Gh45[i, j] = (G[i-1, j] + G[i+1, j])/2 + \\ (2 \cdot Z[i, j] - Z[i-2, j] - Z[i+2, j])/8 + \\ (2 \cdot Z[i+1, j-1] - Z[i-1, j-1] - Z[i+3, j-1] + \\ 2 \cdot Z[i-1, j+1] - Z[i-3, j+1] - Z[i+1, j+1])/16$$ formula 47

$$Gh135[i, j] = (G[i-1, j] + G[i+1, j])/2 + \\ (2 \cdot Z[i, j] - Z[i-2, j] - Z[i+2, j])/8 + \\ (2 \cdot Z[i-1, j-1] - Z[i-3, j-1] - Z[i+1, j-1] + \\ 2 \cdot Z[i+1, j+1] - Z[i-1, j+1] - Z[i+3, j+1])/16$$ formula 48

FIG. 8 shows the positions of the color information used to calculate the green color interpolation value G[i,j]. In FIG. 8, the color information at the circled pixels is used as a contributing factor in the curvature information that constitutes the green color interpolation value G[i,j].

In each of formulae 43~48, the first term constitutes the "local average information of the green color component" and corresponds to the primary terms in formulae 1 and 2. The second term represents the "local curvature information based upon a color component matching a color component at the interpolation target pixel" and the third term represents the "local curvature information based upon a color component other than the color component at the interpolation target pixel." It is to be noted that the curvature information in the second and third terms is obtained through quadratic differentiation of the color components. To explain this point by referring to formula 44, in the second term of formula 44, the difference between the color information Z[i,j] and the color information Z[i,j−2] and the difference between the color information Z[i,j+2] and the color information Z[i,j] are obtained and then the difference between these differences is ascertained. In the third term the difference between the color information Z[i−1,j+1] and the color information Z[i−1,j−1] and the difference between the color information Z[i−1,j+3] and the color information Z[i−1,j+1] are obtained with the difference between these differences then ascertained and the difference between the color information Z[i+1,j−1] and the color information Z[i+1,j−3] and the difference between the color information Z[i+1,j+1] and the color information Z[i+1,j−1] are obtained with the difference between these differences then ascertained.

In Gv45[i,j], the "local curvature information based upon a color component matching the color component at the interpolation target pixel" is local curvature information with directionality manifesting along the vertical direction, and the "local curvature information based upon a color component other than the color component at the interpolation target pixel" is local curvature information with directionality manifesting along the vertical direction and the diagonal 45° direction. In Gv135[i,j], the "local curvature information based upon a color component matching the color component at the interpolation target pixel" is local curvature information with directionality manifesting along the vertical direction, and the "local curvature information based upon a color component other than the color component at the interpolation target pixel" is local curvature information with directionality manifesting along the vertical direction and the diagonal 135° direction. In Gh45[i,j], the "local curvature information based upon a color component matching the color component at the interpolation target pixel" is local curvature information with the directionality manifesting along the horizontal direction, and the "local curvature information based upon a color component other than the color component at the interpolation target pixel" is local curvature information with directionality manifesting along the horizontal direction and the diagonal 45° direction. In Gh135[i,j], the "local curvature information based upon a color component matching the color component at the interpolation target pixel" is local curvature information with directionality manifesting along the horizontal direction, and the "local curvature information based upon a color component other than the color component at the interpolation target pixel" is local curvature information with directionality manifesting along the horizontal direction and the diagonal 135° direction.

In addition, the "local curvature information based upon a color component matching the color component at the interpolation target pixel" and the "local curvature information based upon a color component other than the color component at the interpolation target pixel" in Gv[i,j] are both local curvature information with directionality manifesting along the vertical direction, and the "local curvature information based upon a color component matching the color component at the interpolation target pixel" and the "local curvature information based upon a color component other than the color component at the interpolation target pixel" in Gh[i,j] are both local curvature information with directionality manifesting along the horizontal direction.

In other words, in the first embodiment, the local average information of the green color component is corrected by using the "local curvature information based upon a color component matching the color component at the interpolation target pixel" and the "local curvature information based upon a color component other than the color component at the interpolation target pixel."

For instance, when marked similarity manifests along the diagonal directions and the green color interpolation value is calculated by using Gv45[i,j], Gv135[i,j], Gh45[i,j] and Gh135[i,j] (case 1, case 3, case 4, case 6, case 7 or case 9), the local average information of the green color component (the primary term) is corrected by using the local curvature information based upon the red color component and the local curvature information based upon the blue color component at phases that are opposite from each other. In such a case, color information in the individual color components to be used to calculate the local curvature information corresponding to each color component is obtained from pixels that are present on both sides of a line drawn along a direction judged to manifest marked similarity.

Figure 9A:
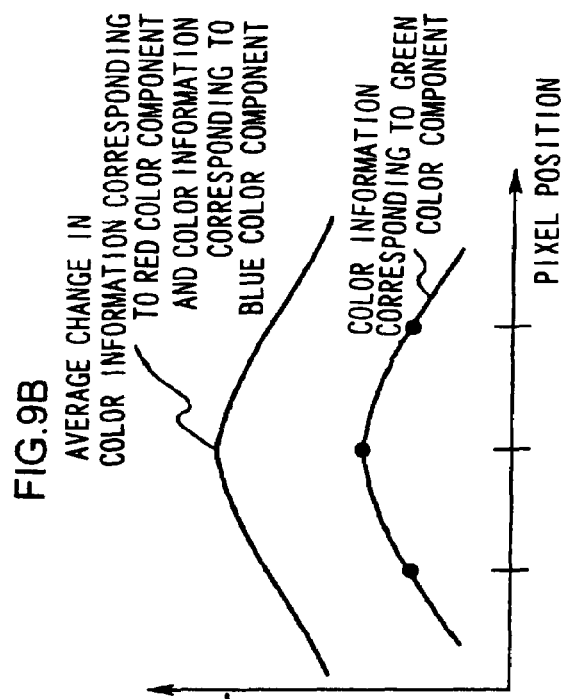
FIGS. 9A and 9B show how the adverse effect of magnification chromatic aberration is eliminated.
Figure 18A:
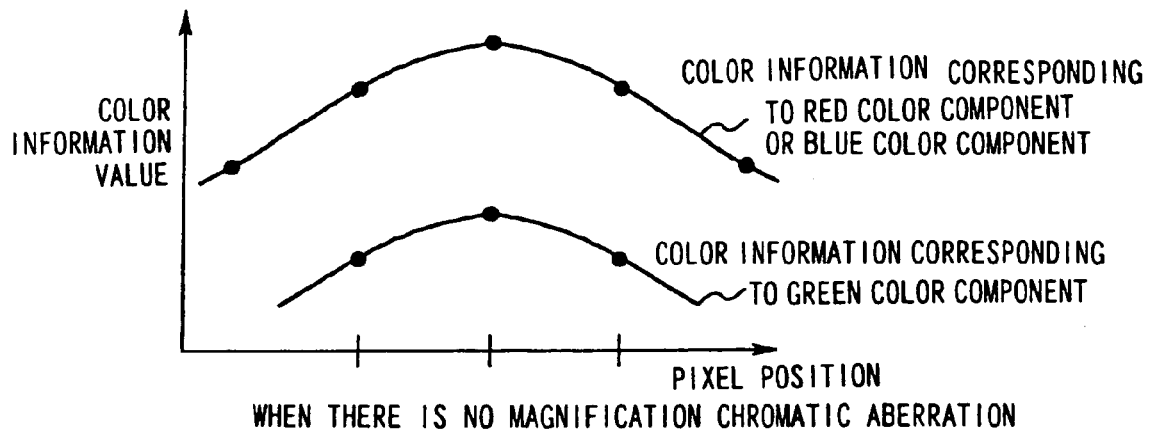
FIGS. 18A~18C illustrate the adverse effects of magnification chromatic aberration.
Figure 18B:
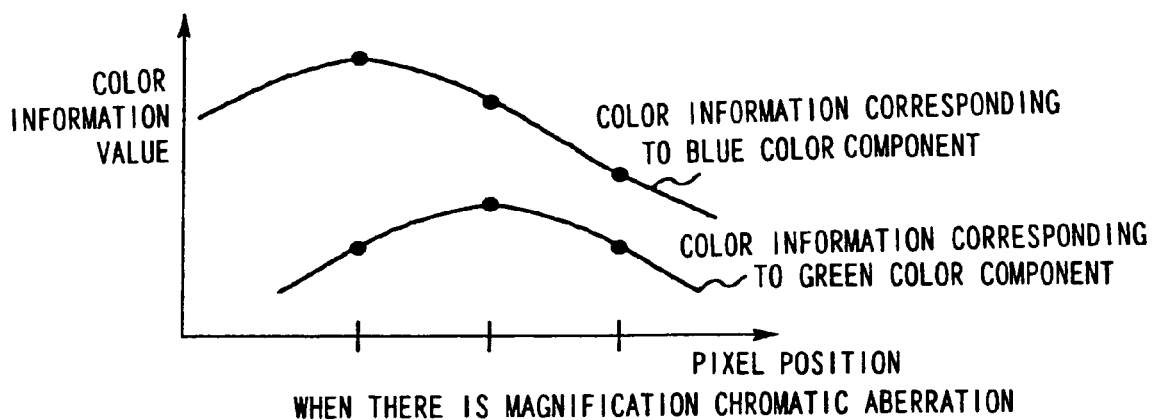
Figure 18C:
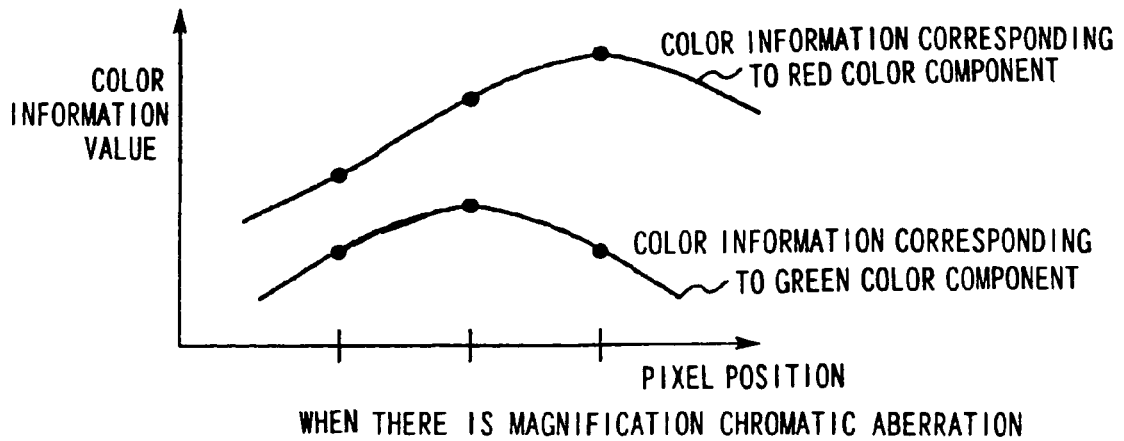
Figure 20A:
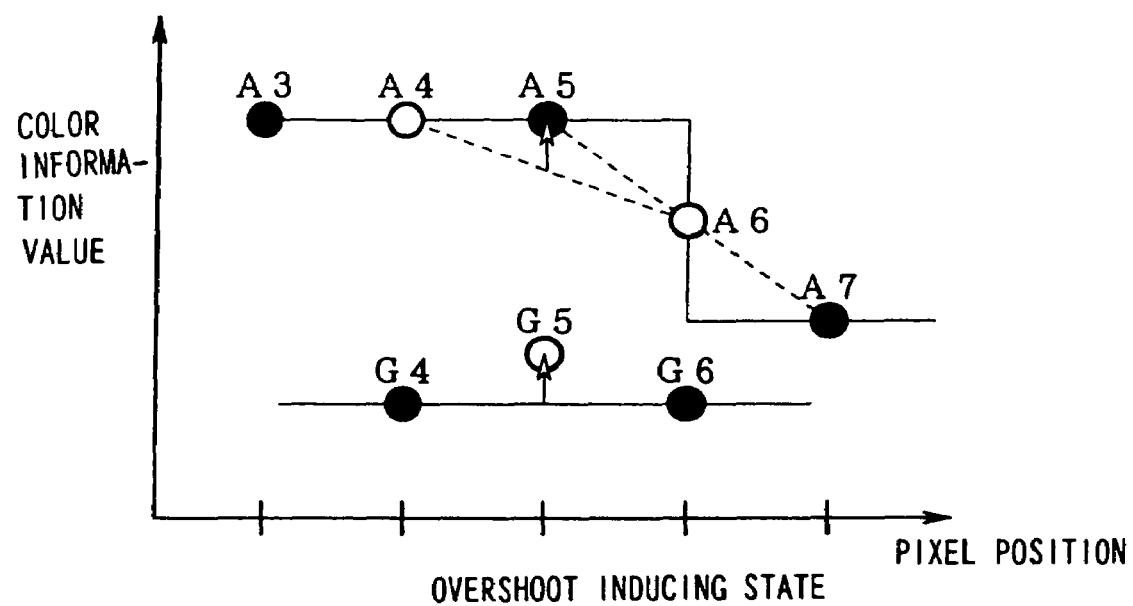
FIGS. 20A and 20B illustrate the effects of over correction occurring at a color boundary.
Figure 20B:
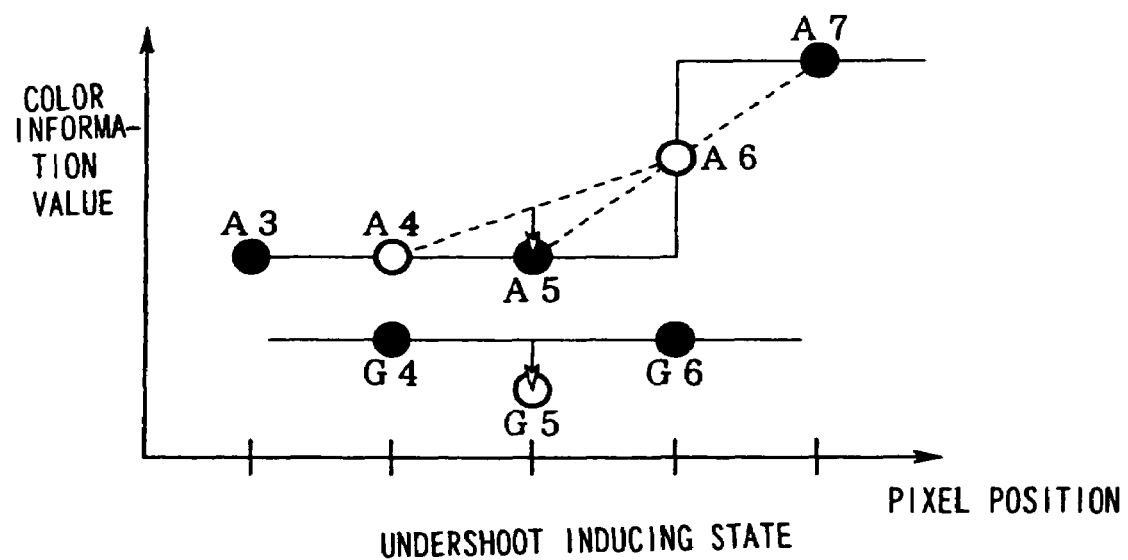

Thus, even when the color information corresponding to the red color component and the color information corresponding to the blue color component are offset relative to the color information corresponding to the green color component due to magnification chromatic aberration, as illustrated in FIG. 9A (equivalent to a drawing achieved by superimposing FIG. 18B on FIG. 18C), the primary term is corrected in correspondence to the average quantity of change in the color information corresponding to the red color component and the color information corresponding to the blue color component. As a result, by adopting the first embodiment, the primary term can be corrected for a desired pixel even if there is magnification chromatic aberration at the photographic optical system 12, with the overshoot and the undershoot occurring as a result of the G interpolation processing disclosed in U.S. Pat. No. 5,629,734 canceled out by each other. Consequently, the occurrence of color artifacts attributable to over correction can be reduced in the first embodiment.

It is to be noted that while an overshoot may also occur when correcting a primary term constituted of color information corresponding to the blue color component as well as when correcting a primary term constituted of color information corresponding to the red color component, overshoot values corresponding to the individual color components are averaged in the first embodiment and thus, the average value does not exceed an overshoot value resulting from the G interpolation processing disclosed in U.S. Pat. No. 5,629,734. In addition, even if an undershoot occurs when correcting a primary term constituted of color information corresponding to the blue color component or correcting a primary term constituted of color information corresponding to the red color component, the undershoot value in the first embodiment never exceeds the undershoot value resulting from the G interpolation processing disclosed in U.S. Pat. No. 5,629,734.

In the first embodiment, the image data to undergo the G interpolation processing are arranged in a Bayer array as shown in FIGS. 2A and 2B, with the color information corresponding to the red color component and the color information corresponding to the blue color component positioned diagonally to each other. Thus, if color information corresponding to the blue color component is provided at the interpolation target pixel, for instance, the local curvature information based upon the red color component to be used to correct the primary term is calculated by using color information corresponding to the red color component at pixels positioned along a diagonal direction along which marked similarity to the interpolation target pixel manifests. In addition, the green color interpolation value is calculated by using the color information at pixels set along a diagonal direction distanced from the interpolation target pixel such as Z[i−1,j+3] and Z[i+1,j−3] in formula 44, Z[i−1,j−3] and Z[i+1,j+3] in formula 45, Z[i+3,j−1] and Z[i−3,j+1] in formula 47 and Z[i−3,j−1] and Z[i+3,j+1] in formula 48.

As a result, in the G interpolation processing in the first embodiment which requires a highly accurate judgment on the diagonal similarity, the interpolation processing unit 17 achieves a high degree of accuracy in the judgement of the diagonal similarity by using a plurality of sets of color information when calculating a plurality of types of similarity degree components along the diagonal 45° direction and the diagonal 135° direction.

In other words, the accuracy of the interpolation processing is improved through a highly accurate judgment on the diagonal similarity in the first embodiment.

In addition, if marked similarity manifests along the vertical direction or the horizontal direction and thus the green interpolation value is calculated using Gv[i,j] or Gh[i,j] (case 2 or case 8), local curvature information based upon the green color component is used as the "local curvature information based upon a color component other than the color component at the interpolation target pixel" and the local average information of the green color component is corrected by using local curvature information based upon the red color component or the blue color component and local curvature information based upon the green color component.

Under normal circumstances, due to the effect of magnification chromatic aberration, the red color component, the green color component and the blue color component may have relative positional offsets in order of wavelength, i.e. in order of red color, green color and blue color. And the green color component positions between the red color component and the blue color component. Thus, if color information corresponding to the red color component is provided at the interpolation target pixel, the local curvature information based upon the green color component can be used as a component at a phase opposite from the phase of the local curvature information based upon the red color component to reduce the occurrence of color artifacts resulting from over correction. Also, in the same manner, if color information corresponding to the blue color component is provided at the interpolation target pixel, the local curvature information based upon the green color component can be used as a component at a phase opposite from the phase of the local curvature information based upon the blue color component to reduce the occurrence of color artifacts resulting from over correction.

In the following explanation of the RB interpolation processing operation, the RB interpolation processing implemented in the prior art is first described and then the R interpolation processing in FIG. 5 in the RB interpolation processing implemented in the first embodiment is explained (an explanation of the B interpolation processing is omitted).

A known example of the RB interpolation processing in the prior art is linear interpolation processing implemented in a color difference space in which after calculating color differences at all the pixels (values each obtained by subtracting the value indicated by color information corresponding to the green color component from the value indicated by color information corresponding to the red color component (or the blue color component)), one of the three different types of processing (1)~(3) described below is implemented on each interpolation target pixel to calculate the interpolation value.

(1) If a color component missing at the interpolation target pixel is present at the two pixels adjacent to the interpolation target pixel along the vertical direction, the interpolation target value is calculated as a value achieved by adding the color information corresponding to the green color component at the interpolation target pixel to the average of the color differences at the two pixels.

(2) If a color component missing at the interpolation target pixel is present at the two pixels adjacent to the interpolation target pixel along the horizontal direction, the interpolation target value is calculated as a value achieved by adding the value indicated by the color information corresponding to the green color component at the interpolation target pixel to the average of the color differences at the two pixels.

(3) If a color component missing at the interpolation target pixel is present at the four pixels adjacent to the interpolation target pixel along the diagonal directions, the interpolation target value is calculated as a value achieved by adding the value indicated by the color information corresponding to the green color component at the interpolation target pixel to the average of the color differences at the four pixels.

In addition, interpolation processing that incorporates nonlinear median processing, which is more effective in preventing color artifacts compared to linear processing in a color difference space is also implemented in the prior art.

Figures 10A, 10B, 10C:
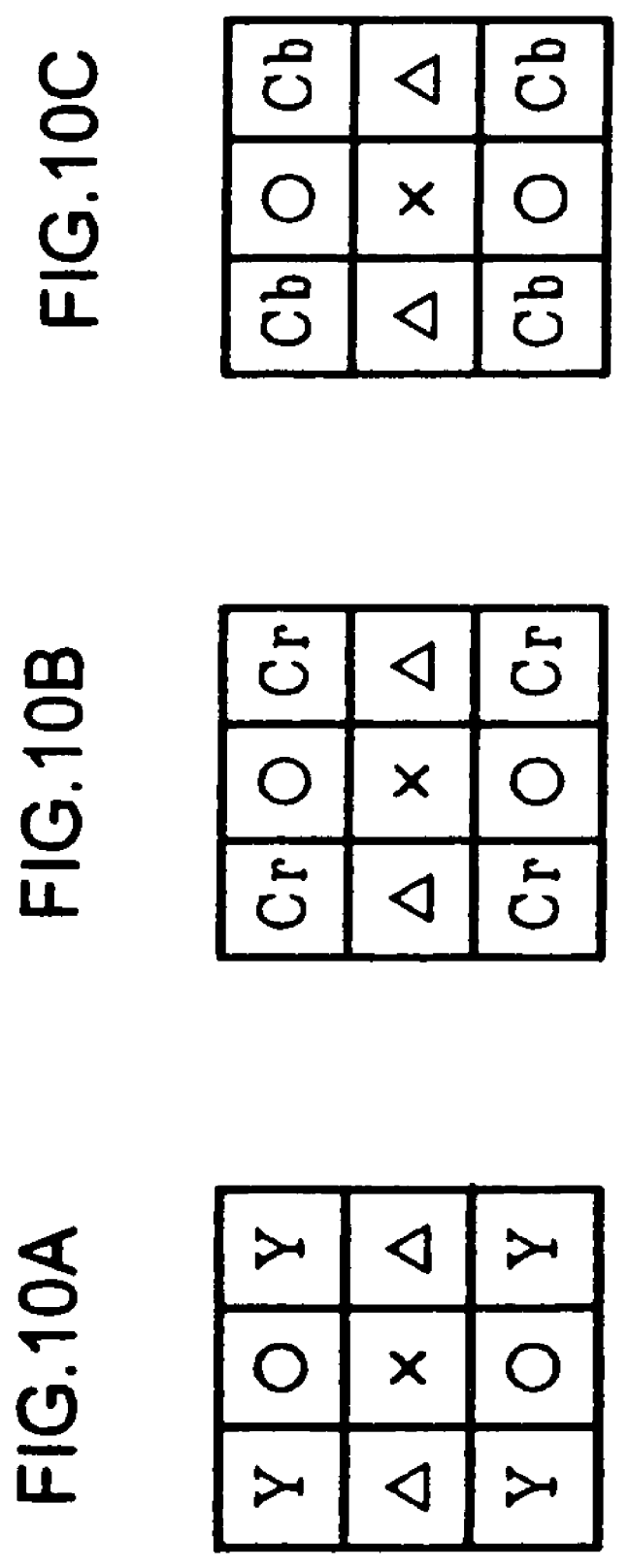

In the art disclosed in U.S. Pat. No. 5,799,113, in which video signals provided in one of the following calorimetric systems, RGB, YUV and YCbCr, undergo culled compression at a resolution of ¼ to reduce the transmission volume, nonlinear median processing is implemented to restore the video signals to the original resolution by interpolating 3-component data at the culled pixels which have been lost. For instance, if the video signals are provided in the YCbCr colorimetric system, the interpolation values for the luminance component Y and the interpolation values corresponding to the color components Cb and Cr at the culled pixels marked ○, Δ and X in FIGS. 10A~10C are calculated through identical arithmetic processing. It is to be noted that in order to retain the structure at an edge, the pixel marked X alone is interpolated by using the median value (median) of the values at four nearby pixels, the pixels marked ○ are each interpolated by using the average of the values at the pixels adjacent along the horizontal direction and the pixels marked Δ are each interpolated by using the average of the values at the pixels adjacent along the vertical direction.

However, while the interpolation processing implemented as described above is effective in restoring the image quality in a dynamic image, it is not suited for processing a still image that requires high definition. Namely, the art disclosed in U.S. Pat. No. 5,799,113, in which the luminance component Y and the color components Cr and Cb are handled in exactly the same way, achieves only a very low degree of accuracy with regard to the interpolation values for the luminance component Y which determines the resolution. In addition, since the luminance component Y is interpolated by using the median, the likelihood of the image structure becoming lost is high. Furthermore, there is a concern that color artifacts may spread when the data are converted to the RGB calorimetric system.

In an electronic camera which employs an image-capturing sensor constituted by arranging R, G and B color filters in a Bayer array to generate a still image, the interpolation processing on the green color component which is equivalent to the luminance component with a high spatial frequency (G interpolation processing) can be implemented with a very high degree of accuracy by using similarity manifesting between the interpolation target pixel and nearby pixels and calculating the interpolation value using a plurality of color components, as explained earlier. In such an electronic camera, after implementing high-definition interpolation processing on the green color component, which most faithfully reflects the high-frequency information in the image data, the interpolation processing on the red color component and the blue color component is achieved through linear interpolation in color difference spaces relative to the green color component to reduce color artifacts by reflecting the high-frequency information in the image data in the red color component and the blue color component.

For instance, if the sets of color information at individual pixels are arranged one-dimensionally in the order of (R1, G2, R3), the red color interpolation value is calculated through;

$$R2=(R1+R3)/2+(2 \cdot G2-G1-G3)/2 \quad \text{formula 49.}$$

In the formula, G2 represents color information corresponding to the green color component in the original image and G1 and G3 each represent a green color interpolation value obtained through the G interpolation processing.

However, this RB interpolation processing poses a problem in that the color artifact is allowed to remain in the vicinity of an isolated point (an image area manifesting only slight similarity to nearby pixels and having a high spatial frequency). In the prior art, this type of color artifact is often eliminated in post processing, in which a and b hue planes obtained by converting the image data to the Lab calorimetric system individually undergo median filtering after the G interpolation processing and the RB interpolation processing are implemented.

Since a 3×3 (=9 points) filter size achieves hardly any effect, the filter size must be set over a large range of 5×5 (=25 points) when applying such a median filter.

In other words, in the electronic camera described above, extremely heavy processing must be implemented since both the RB interpolation processing in the prior art and the median processing must be performed in the interpolation processing on the red color component and the blue color component in a still image and also the filter size must be set over a wide range for the median processing. Furthermore, the risk of the fine structure in a colored area (hereafter referred to as a "color structure") being lost is higher when the filter size in the median processing is increased.

Accordingly, in the first embodiment, RB interpolation processing through which red color and blue color interpolation values can be calculated quickly with a high degree of accuracy without allowing any color artifacts to remain in the vicinity of an isolated point or losing the color structure is proposed. It is to be noted that the following is an explanation of the only R interpolation processing in the RB interpolation processing, given in reference to FIG. 5.

First, the interpolation processing unit 17 calculates a color difference that contains the red color component for each pixel at which color information corresponding to the red color component is present by subtracting the green color interpolation value (the value obtained through the G interpolation processing explained earlier) from the value indicated by the color information corresponding to the red color component (FIG. 5 S1).

For instance, the interpolation processing unit 17 calculates a color difference Cr[i,j] containing the red color component at a pixel at given coordinates [i,j] with color information corresponding to the red color component as;

$$Cr[i,j]=R[i,j]-G[i,j] \quad \text{formula 50.}$$

It is to be noted that in the first embodiment, when the color differences containing the red color component have been calculated as described above, the color differences containing the red color component are set so as to surround pixels at which color information corresponding to the red color component is missing and color information corresponding to the blue color component is present from the four diagonal directions.

The interpolation processing unit 17 interpolates the color difference containing the red color component for each of the pixels surrounded by color differences containing the red color component from the four diagonal directions (each pixel at which color information corresponding to the red color component is missing and color information corresponding to the blue color component is present in the first embodiment) by using the median of the color differences containing the red color component at the pixels set diagonally to the target pixel (FIG. 5 S2).

Namely, in the first embodiment, the interpolation processing unit 17 calculates the color difference Cr[m,n] at the pixel at given coordinates [m,n] surrounded by color differences containing the red color component from the four diagonal directions as shown in FIG. 11A through;

$$Cr[m,n]=\text{median}\{Cr[m-1,n-1],Cr[m+1,n-1],Cr[m-1,n+1],Cr[m+1,n+1]\} \quad \text{formula 51.}$$

In the formula, median{ } represents a function through which the median of a plurality of elements is calculated and, if there are an even number of elements, it takes the average of the two middle elements.

In the first embodiment, when the color differences containing the red color component have been calculated through formulae 50 and 51, the color differences containing the red color component are set so as to surround pixels at which color information corresponding to the red color component and color information corresponding to the blue color component are both missing from the four directions; i.e., from above, from below and from the left and the right.

The interpolation processing unit 17 interpolates the color difference containing the red color component for each of the pixels surrounded by color differences containing the red color component from the four directions; i.e., from above, from below and from the left and the right (each pixel at which color information corresponding to the red color component and color information corresponding to the blue color component are both missing in the first embodiment) by using the median of the color differences containing the red color component at the pixels set above, below and to the left and the right of the pixel (FIG. 5 S3).

Namely, in the first embodiment, the interpolation processing unit 17 calculates the color difference Cr[m,n] at the pixel at given coordinates [m,n] surrounded by color differences containing the red color component from the four directions; i.e., from above, from below and from the left and the right as shown in FIG. 11B through;

$$Cr[m,n]=\text{median}\{Cr[m,n-1],Cr[m-1,n],Cr[m+1,n],Cr[m,n+1]\} \quad \text{formula 52}$$

Next, the interpolation processing unit 17 converts the color difference containing the red color component calculated through formula 51 or formula 52 for each pixel at which color information corresponding to the red color component is missing to a red color interpolation value by using color information corresponding to the green color component (or the green color interpolation value) (FIG. 5 S4).

Namely, the interpolation processing unit 17 calculates the red color interpolation value R[m,n] for the pixel at given coordinates [m,n] through;

$$R[m,n]=Cr[m,n]+G[m,n] \quad \text{formula 53}$$

Figures 12A, 12B:
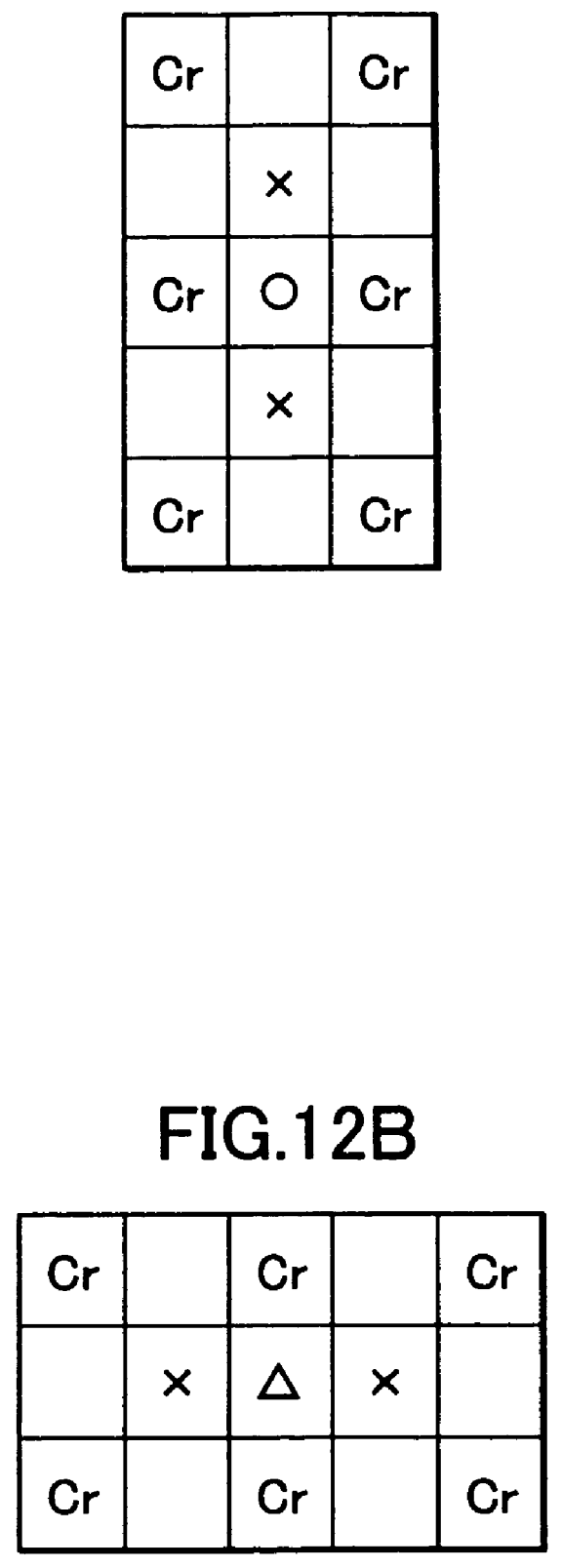

The median processing described above is implemented on the color differences representing the hue alone and is not implemented on the luminance component. In addition, when the pixel marked ○ in FIG. 12A is the interpolation target pixel in the R interpolation processing, the color differences containing the red color component at the pixels marked X are calculated by using the color differences Cr over a 3×5 range, and thus, the color difference containing the red color component at the pixel marked ○ represents a value which is close to the results of median processing implemented by weighting the color differences Cr within the 3×5 range. When the pixel marked Δ in FIG. 12B is the interpolation target pixel, on the other hand, the color differences containing the red color component at the pixels marked X are calculated by using the color differences Cr over a 5×3 range, and thus, the color difference containing the red color component at the pixel marked Δ represents a value which is close to the results of median processing implemented by weighting the color differences Cr within the 5×3 range.

In other words, in the first embodiment, advantages substantially similar to those achieved through median processing implemented over a wide range are achieved while keeping down the filter size. As a result, by adopting the first embodiment, the occurrence of color artifacts around an isolated point is reduced without destroying the color structure. Thus, a great improvement is achieved in the color artifact reduction effect over the art disclosed in U.S. Pat. No. 5,799,113.

In addition, since the color differences at only four points are each used in the median processing in FIG. 5 S2 and FIG. 5 S3 in the first embodiment, good processing efficiency is achieved and extremely fast median processing is enabled.

It is to be noted that while the RB interpolation processing is implemented after the G interpolation processing in the first embodiment, RB interpolation processing similar to that in the embodiment can be implemented without having to perform G interpolation processing on image data provided in the YCbCr calorimetric system with Y, Cb and Cr culled at a ratio of 4:2:0 since the luminance component Y is left intact in the image data.

Second Embodiment

The following is an explanation of the operation achieved in the second embodiment.

It is to be noted that since the RB interpolation processing in the second embodiment is implemented as in the first embodiment, its explanation is omitted.

In the following explanation of the G interpolation processing, a description of the operating details identical to those in the first embodiment is omitted. It is to be noted that the difference between the G interpolation processing in the second embodiment and the G interpolation processing in the first embodiment is in the values of Gv[i,j], Gv45[i,j], Gv135[i,j], Gh[i,j], Gh45[i,j] and Gh135[i,j] used when calculating the green interpolation value G[i,j]. For this reason, the flowchart of the operation in the interpolation processing unit 17 during the G interpolation processing is not provided for the second embodiment. In addition, while an explanation is given below on an assumption that the red color component is present at the interpolation target pixel as shown in FIG. 2A, the second embodiment may be adopted when implementing processing on an interpolation target pixel at which the blue color component is present, as shown in FIG. 2B.

The interpolation processing unit 17 ascertains the degrees of similarity manifesting at the interpolation target pixel as in the first embodiment (corresponds to FIG. 4 S1~S11) and classifies the type of the similarity at the interpolation target pixel as one of cases 1~9 explained earlier. Then, the interpolation processing unit 17 calculates the green color interpolation value G[i,j] as indicated below.

In case 1, G[i,j]=Gv45[i,j]
In case 2, G[i,j]=Gv[i,j]
In case 3, G[i,j]=Gv135[i,j]
In case 4, G[i,j]=(Gv45[i,j]+Gh45[i,j])/2
In case 5, G[i,j]=(Gv[i,j]+Gh[i,j])/2
In case 6, G[i,j]=(Gv135[i,j]+Gh135[i,j])/2 S
In case 7, G[i,j]=Gh45[i,j]
In case 8, G[i,j]=Gh[i,j]
In case 9, G[i,j]=Gh135[i,j], with $$Gv[i,j]=gv[i,j]+\beta \text{red}\cdot \delta Rv[i,j]+\beta \text{green}\cdot \delta Gv[i,j] \quad \text{formula 54}$$

$$Gv45[i,j]=gv[i,j]+\alpha \text{red}\cdot \delta Rv45[i,j]+\alpha \text{green}\cdot \delta Gv[i,j]+\alpha \text{blue}\cdot \delta Bv45[i,j] \quad \text{formula 55}$$

$$Gv135[i,j]=gv[i,j]+\alpha \text{red}\cdot \delta Rv135[i,j]+\alpha \text{green}\cdot \delta Gv[i,j]+\alpha \text{blue}\cdot \delta Bv135[i,j] \quad \text{formula 56}$$

$$Gh[i,j]=gh[i,j]+\beta \text{red}\cdot \delta Rh[i,j]+\beta \text{green}\cdot \delta Gh[i,j] \quad \text{formula 57}$$

$$Gh45[i,j]=gh[i,j]+\alpha \text{red}\cdot \delta Rh45[i,j]+\alpha \text{green}\cdot \delta Gh[i,j]+\alpha \text{blue}\cdot \delta Bh45[i,j] \quad \text{formula 58}$$

$$Gh135[i,j]=gh[i,j]+\alpha \text{red}\cdot \delta Rh135[i,j]+\alpha \text{green}\cdot \delta Gh[i,j]+\alpha \text{blue}\cdot \delta Bh135[i,j] \quad \text{formula 59}$$

α red, α green, α blue, β red and β green in formulae 54~59 each represent a constant which may be 0 or a positive value, and they satisfy α red+α green+α blue=1 and β red+β green=1. In the formula above, gv[i,j] and gh[i,j] each constitute a term corresponding to the "local average information of the green color component" and are equivalent to the primary term in formula 1 or formula 2, and δRv45[i,j], δRv[i,j], δRv135[i,j], δRh45[i,j], δRh[i,j], δRh135[i,j], δGv45[i,j], δGh[i,j], δBv45[i,j], δBv135[i,j], δBh45[i,j] and δBh135[i,j] each represent a term corresponding to the local curvature information in the corresponding color component.

It is to be noted that the local average information of the green color component and the local curvature information based upon the individual color components are calculated as indicated below, depending upon the direction along which similarity manifests.

(Local Average Information of the Green Color Component)

$$gv[i,j]=(G[i,j-1]+G[i,j+1])/2 \quad \text{formula 60}$$

$$gh[i,j]=(G[i-1,j]+G[i+1,j])/2 \quad \text{61}$$

(Local Curvature Information Based upon the Red Color Component)

$$\delta Rv45[i,j] = \quad \text{formula 62}$$
$$kr1(2\cdot Z[i-2, j+2] - Z[i-2, j] - Z[i-2, j+4])/4 +$$
$$kr2(2\cdot Z[i, j] - Z[i, j-2] - Z[i, j+2])/4 +$$
$$kr3(2\cdot Z[i+2, j-2] - Z[i+2, j-4] - Z[i+2, j])/4$$

$$\delta Rv[i,j] = \quad \text{formula 63}$$
$$kr1(2\cdot Z[i-2, j] - Z[i-2, j-2] - Z[i-2, j+2])/4 +$$
$$kr2(2\cdot Z[i, j] - Z[i, j-2] - Z[i, j+2])/4 +$$
$$kr3(2\cdot Z[i+2, j] - Z[i+2, j-2] - Z[i+2, j+2])/4$$

$$\delta Rv135[i,j] = \quad \text{formula 64}$$
$$kr1(2\cdot Z[i-2, j-2] - Z[i-2, j-4] - Z[i-2, j])/4 +$$
$$kr2(2\cdot Z[i, j] - Z[i, j-2] - Z[i, j+2])/4 +$$
$$kr3(2\cdot Z(i+2, j+2] - Z[i+2, j] - Z[i+2, j+4])/4$$

$$\delta Rh45[i,j] = \quad \text{formula 65}$$
$$kr1(2\cdot Z[i+2, j-2] - Z[i, j-2] - Z[i+4, j-2])/4 +$$
$$kr2(2\cdot Z[i, j] - Z[i-2, j] - Z[i+2, j])/4 +$$
$$kr3(2\cdot Z[i-2, j+2] - Z[i-4, j+2] - Z[i, j+2])/4$$

$$\delta Rh[i,j] = \quad \text{formula 66}$$
$$kr1(2\cdot Z[i, j-2] - Z[i-2, j-2] - Z[i+2, j-2])/4 +$$
$$kr2(2\cdot Z[i, j] - Z[i-2, j] - Z[i+2, j])/4 +$$
$$kr3(2\cdot Z[i, j+2] - Z[i-2, j+2] - Z[i+2, j+2])/4$$

$$\delta Rh135[i,j] = \quad \text{formula 67}$$
$$kr1(2\cdot Z[i-2, j-2] - Z[i-4, j-2] - Z[i, j-2])/4 +$$
$$kr2(2\cdot Z[i, j] - Z[i-2, j] - Z[i+2, j])/4 +$$
$$kr3(2\cdot Z(i+2, j+2] - Z[i, j+2] - Z[i+4, j+2])/4,$$

with kr1, kr2 and kr3 each representing a constant which may be 0 or a positive value and satisfying kr1+kr2+kr3=1.

(Local Curvature Information Based upon the Green Color Component)

$$\delta Gv[i,j]=(2\cdot G[i-1,j]-G[i-1,j-2]-G[i-1,j+2]+2\cdot G[i+1,j]-G[i+1,j-2]-G[i+1,j+2])/8 \quad \text{formula 68}$$

$$\delta Gh[i,j]=(2\cdot G[i,j-1]-G[i-2,j-1]-G[i+2,j-1]+2\cdot G[i,j+1]-G[i-2,j+1]-G[i+2,j+1])/8 \quad \text{formula 69}$$

(Local Curvature Information Based upon the Blue Color Component)

$$\delta Bv45[i,j]=(2\cdot Z[i-1,j+1]-Z[i-1,j-1]-Z[i-1,j+3]+2\cdot Z[i+1,j-1]-Z[i+1,j-3]-Z[i+1,j+1])/8 \quad \text{formula 70}$$

$$\delta Bv135[i,j]=(2\cdot Z[i-1,j-1]-Z[i-1,j-3]-Z[i-1,j+1]+2\cdot Z[i+1,j+1]-Z[i+1,j-1]-Z[i+1,j+3])/8 \quad \text{formula 71}$$

$$\delta Bh45[i,j]=(2\cdot Z[i+1,j-1]-Z[i-1,j-1]-Z[i+3,j-1]+2\cdot Z[i-1,j+1]-Z[i-3,j+1]-Z[i+1,j+1])/8 \quad \text{formula 72}$$

$$\delta Bh135[i,j]=(2\cdot Z[i-1,j-1]-Z[i-3,j-1]-Z[i+1,j-1]+2\cdot Z[i+1,j+1]-Z[i-1,j+1]-Z[i+3,j+1])/8 \quad \text{formula 73}$$

It is to be noted that FIGS. 13 and 14 show the positions of the color information used when calculating local curvature information based upon the individual color components. Namely, local curvature information corresponding to a given color component is obtained through weighted addition of the components of the curvature information calculated by using color information at the pixels contained within the area enclosed by the oval in FIG. 13 or 14.

In other words, δRv45[i,j] is local curvature information with directionality manifesting along the vertical direction and the diagonal 45° direction, δRv[i,j] is local curvature information with directionality manifesting along the vertical direction, δRv135[i,j] is local curvature information with directionality manifesting along the vertical direction and the diagonal 135° direction, δRh45[i,j] is local curvature information with directionality manifesting along the horizontal direction and the diagonal 45° direction, δRh[i,j] is local curvature information with directionality manifesting along the horizontal direction and δRh135[i,j] is local curvature information with directionality manifesting along the horizontal direction and the diagonal 135° direction.

In addition, δGv[i,j] is local curvature information with directionality manifesting along the vertical direction and δGh[i,j] is local curvature information with directionality manifesting along the horizontal direction.

δBv45[i,j] is local curvature information with directionality manifesting along the vertical direction and the diagonal 45° direction, δBv135[i,j] is local curvature information with directionality manifesting along the vertical direction and the diagonal 135° direction, δBh45[i,j] is local curvature information with directionality manifesting along the horizontal direction and the diagonal 45° direction and δBh135[i,j] is local curvature information with directionality manifesting along the horizontal direction and the diagonal 135° direction.

It is to be noted that the first embodiment explained earlier is equivalent to a situation in which the ratios of the coefficients in formulae 54~59 and formulae 62~67 in the second embodiment are set at;

α red:α green:α blue=1:0:1, β red:β green=1:1 and kr1:kr2:kr3=0:1:0.

In the second embodiment, G interpolation processing with varying characteristics and achieving various advantages can be realized by setting different ratios for these coefficients. The following is an explanation of typical examples of ratio setting for the coefficients and features and advantages of the individual examples.

EXAMPLE 1

α red:α green:α blue=1:0:1, β red:β green=1:1 and kr1:kr2:kr3=1:6:1.

By setting these ratios, the method of calculating the local curvature information based upon the red color component is changed from that adopted in the first embodiment, and the local curvature information based upon the red color component extracted from a wider range than in the first embodiment is made to undergo mild low pass filtering as appropriate while taking into consideration the directionality. Thus, by adopting the settings in example 1, the overall effect for reducing over correction is improved over the first embodiment.

EXAMPLE 2

α red:α green:α blue=1:1:0, β red:β green=1:1 and kr1:kr2:kr3=0:1:0.

Through these settings, the local curvature information based upon the blue color component which prevents an over correction attributable to the local curvature information based upon the red color component when similarity manifests along the diagonal direction in the first embodiment is all substituted with local curvature information based upon the green color component. Thus, by adopting the settings in example 2, the need for making a judgment with regard to similarity manifesting along the diagonal directions is eliminated to simplify the algorithm and, at the same time, the extraction of structural information at a sufficient level is achieved while preventing over correction.

EXAMPLE 3

α red:α green:α blue=0:1:0, β red:β green=0:1 and kr1:kr2:kr3=setting not required By adopting these settings, the local curvature information based upon the green color component used to prevent over correction of the red color component in example 2 is now used as the main element in the correctional term. The structural information can be extracted even when the correctional term is constituted only of the curvature information based upon the green color component. This means that the curvature information based upon the green color component, too, contains a great deal of structural information equivalent to the curvature information based upon the red color component that passes through the center. In addition, by adopting the settings in example 3, a correction is performed with local curvature information based upon the same color component, i.e., the green color component, as the color component of the average information constituting the primary term. Thus, through the settings in example 3, no over correction occurs and the need for performing a judgment with regard to similarity manifesting along the diagonal directions is eliminated as in example 2, resulting in simplification of the algorithm.

EXAMPLE 4

α red:α green:α blue=0:0:1, β red:β green=0:1 and kr1:kr2:kr3=setting not required The relationship of this example to the first embodiment is similar to the relationship between example 2 and example 3, and by adopting these settings, the curvature information based upon the color component used to prevent an over correction of the local curvature information based upon the red color component is now utilized as the main element in the correctional term. While it is not possible to prevent over correction attributable to local curvature information based upon the blue color component through the settings in example 4, advantages comparable to those in the first embodiment are achieved with regard to the extractions of the local structural information.

EXAMPLE 5

α red:α green:α blue=1:1:1, β red:β green=1:1 and kr1:kr2:kr3=1:0:1

These settings represent an example of ratios of the coefficients effective even when the local curvature information based upon the red color component that passes through the center is not used as a measure against over correction occurring at the settings in example 4. By adopting the settings in example 5, the degree of over correction attributable to local curvature information based upon the blue color component can be reduced with the local curvature information based upon the red color component obtained from nearby pixels when similarity manifests along the diagonal directions, while achieving the advantage of extracting the local structural information as in example 3 and example 4.

Third Embodiment

The following is an explanation of the operation achieved in the third embodiment.

It is to be noted that since the RB interpolation processing in the third embodiment is implemented as in the first embodiment, its explanation is omitted. However, in the third embodiment, color differences containing the red color component are interpolated for some of the pixels at which color information corresponding to the green color component is present (equivalent to the pixels provided with G color filters) through formula 51 presented earlier, and color differences containing the red color component are interpolated for the remaining pixels at which color information corresponding to the green color component is present and for the pixels at which color information corresponding to the blue color component is present through formula 52.

The following is an explanation of the G interpolation processing.

Since the closest pixels at which the green color component (the closest green color component) is present are located along the horizontal direction relative to the pixel to undergo the G interpolation processing as shown in FIGS. 3A and 3B in the third embodiment, it is not necessary to calculate the similarity degrees or to judge the direction along which similarity manifests as required in the first embodiment during the G interpolation processing. However, the calculation of similarity degrees and judgment with regard to the direction along which similarity manifests may be performed along the diagonal 45° direction and the diagonal 135° direction in which the second closest pixels with green color component (the second closest green color component) are present.

In the third embodiment, the interpolation processing unit 17 calculates the green color interpolation value G[i,j] through the following formula 74 based upon the image data arranged as shown in FIGS. 3A and 3B.

$$G[i, j] = (G[i-1, j] + G[i+1, j])/2 + \\ (2 \cdot Z[i, j] - Z[i-2, j] - Z[i+2, j])/8 + \\ (2 \cdot Z[i, j-1] - Z[i-2, j-1] - Z[i+2, j-1] + \\ 2 \cdot Z[i, j+1] - Z[i-2, j+1] - Z[i+2, j+1])/16$$

formula 74

In formula 74, the first term represents the "local average information of the green color component", which is equivalent to the primary terms in formula 1 and formula 2. In addition, while the second term represents the "local curvature information based upon a color component matching the color component at the interpolation target pixel" and the third term represents the "local curvature information based upon a color component other than the color component at the interpolation target pixel", the third term constitutes the "local curvature information based upon the blue color component" if color information corresponding to the red color component is present at the interpolation target pixel (FIG. 3A), whereas the third term constitutes the "local curvature information based upon the red color component" if color information corresponding to the blue color component is present at the interpolation target pixel (FIG. 3B).

In other words, the local average information of the green color component (the primary term) is corrected by using the local curvature information based upon the red color component and the local curvature information based upon the blue color component at phases opposite from each other in the third embodiment.

Figure 9B:
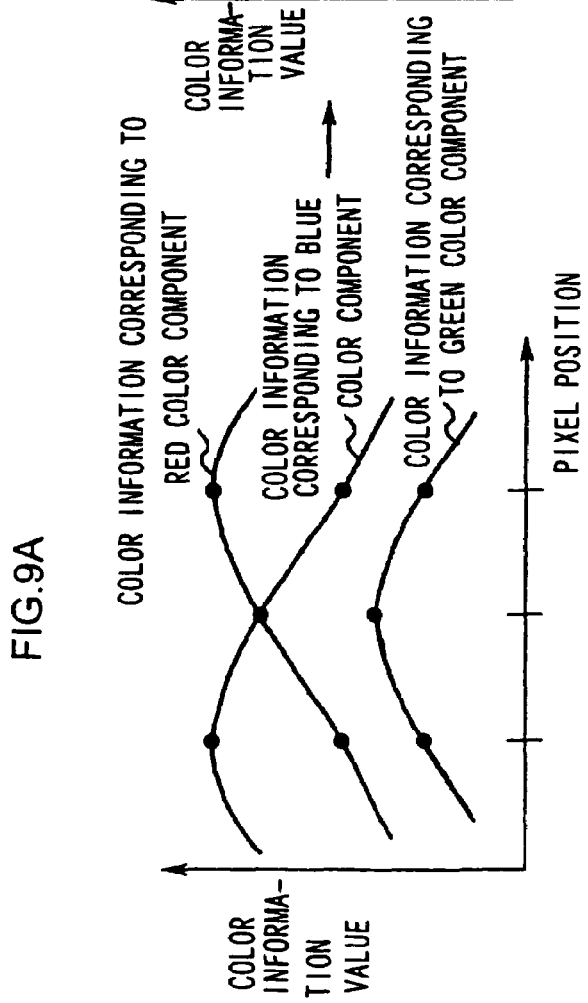

As a result, as in the first embodiment, even when the color information corresponding to the red color component and the color information corresponding to the blue color component are offset relative to the color information corresponding to the green color component due to a magnification chromatic aberration, the primary term is corrected in correspondence to the average change in quantity in the color information corresponding to the red color component and the color information corresponding to the blue color component in the third embodiment (see FIGS. 9A and 9B). Thus, even when there is a magnification chromatic aberration at the photographic optical system 12, the primary term can be corrected for a desired pixel with the overshoot and undershoot occurring in the G interpolation processing disclosed in U.S. Pat. No. 5,629,734 canceling out each other in the third embodiment. Consequently, the occurrence of color artifacts due to over correction can be reduced by adopting the third embodiment.

Fourth Embodiment

The following is an explanation of the operation achieved in the fourth embodiment.

It is to be noted that since the RB interpolation processing in the fourth embodiment is implemented as in the first embodiment, its explanation is omitted.

In the following explanation of the G interpolation processing, operating details identical to those in the first embodiment are not explained. It is to be noted that the difference between the G interpolation processing in the fourth embodiment and the G interpolation processing in the first embodiment is in the operation performed after a judgment is made with regard to degrees of similarity manifested by the interpolation target pixel. For this reason, a flowchart of the operation performed at the interpolation processing unit 17 during the G interpolation processing in the fourth embodiment is not provided.

The interpolation processing unit 17 ascertains degrees of similarity manifesting by the interpolation target pixel as in the first embodiment (corresponds to FIG. 4 S1~S11) and classifies the type of similarity at the interpolation target pixel as one of case 1~9 explained earlier.

Then, the interpolation processing unit 17 calculates the inclination Gk[i,j] of the green color component and the inclination Zk[i,j] of the red color component (or the blue color component) relative to the direction perpendicular to the direction judged to manifest marked similarity as indicated below.

In case 1, $$Gk[i,j]=((G[i-1,j]+G[i,j-1])-(G[i,j+1]+G[i+1,j]))/2 \quad \text{formula 75}$$

$$Zk[i,j]=((Z[i-2,j]+Z[i,j-2])-(Z[i,j+2]+Z[i+2,j]))/2 \quad \text{formula 76}$$

In case 2, $$Gk[i,j]=G[i,j-1]-G[i,j+1] \quad \text{formula 77}$$

$$Zk[i,j]=Z[i,j-2]-Z[i,j+2] \quad \text{formula 78}$$

In case 3, $$Gk[i,j]=((G[i-1,j]+G[i,j+1])-(G[i,j-1]+G[i+1,j]))/2 \quad \text{formula 79}$$

$$Zk[i,j]=((Z[i-2,j]+Z[i,j+2])-(Z[i,j-2]+Z[i+2,j]))/2 \quad \text{formula 80}$$

In case 4, same as an case 1
In case 5,

Gk[i,j]=1, Zk[i,j]=1
In case 6, same as an case 3
In case 7, same as an case 1
In case 8

$$Gk[i,j]=G[i-1,j]-G[i+1,j] \quad \text{formula 81}$$

$$Zk[i,j]=Z[i-2,j]-Z[i+2,j] \quad \text{formula 82}$$

In case 9, same as an case 3

Next, the interpolation processing unit 17 calculates the green color interpolation value G[i,j] as follows.

In case 1, G[i,j]=Gvk[i,j]
In case 2, G[i,j]=Gvk[i,j]
In case 3, G[i,j]=Gvk[i,j]
In case 4, G[i,j]=(Gvk[i,j]+Ghk[i,j])/2
In case 5, G[i,j]=(Gvk[i,j]+Ghk[i,j])/2
In case 6, G[i,j]=(Gvk[i,j]+Ghk[i,j])/2
In case 7, G[i,j]=Ghk[i,j]

In case 8, G[i,j]=Ghk[i,j]
In case 9, G[i,j]=Ghk[i,j], with $$Gvk[i,j]=(G[i,j-1]+G[i,j+1])/2+Gk[i,j]/Zk[i,j]\cdot(2\cdot Z[i,j]-Z[i,j-2]-Z[i,j+2])/4 \quad \text{formula 83}$$

and $$Ghk[i,j]=(G[i-1,j]+G[i+1,j])/2+Gk[i,j]/Zk[i,j]\cdot(2\cdot Z[i,j]-Z[i-2,j]-Z[i+2,j])/4 \quad \text{formula 84.}$$

In formulae 83 and 84, the first term represents the "local average information of the green color component" which is equivalent to the primary term in formula 1 and formula 2. The second term is the "local curvature information based upon a color component matching the color component at the interpolation target pixel" multiplied by a weighting coefficient (a value indicating the correlation between the inclination Gk[i,j] of the green color component and the inclination Zk[i,j] of the red color component (or the blue color component): Gk[i,j]/Zk[i,j]), and is equivalent to the correctional term.

Namely, in the fourth embodiment, the local average information of the green color component is corrected by using the "local curvature information based upon a color component matching the color component at the interpolation target pixel" multiplied by the weighting coefficient.

Now, a problem that arises when calculating the correction value by simply adding the "local curvature information based upon a color component matching the color component at the interpolation target pixel" without being multiplied by the weighting coefficient to the "local average information of the green color component" is discussed.

Figure 15:
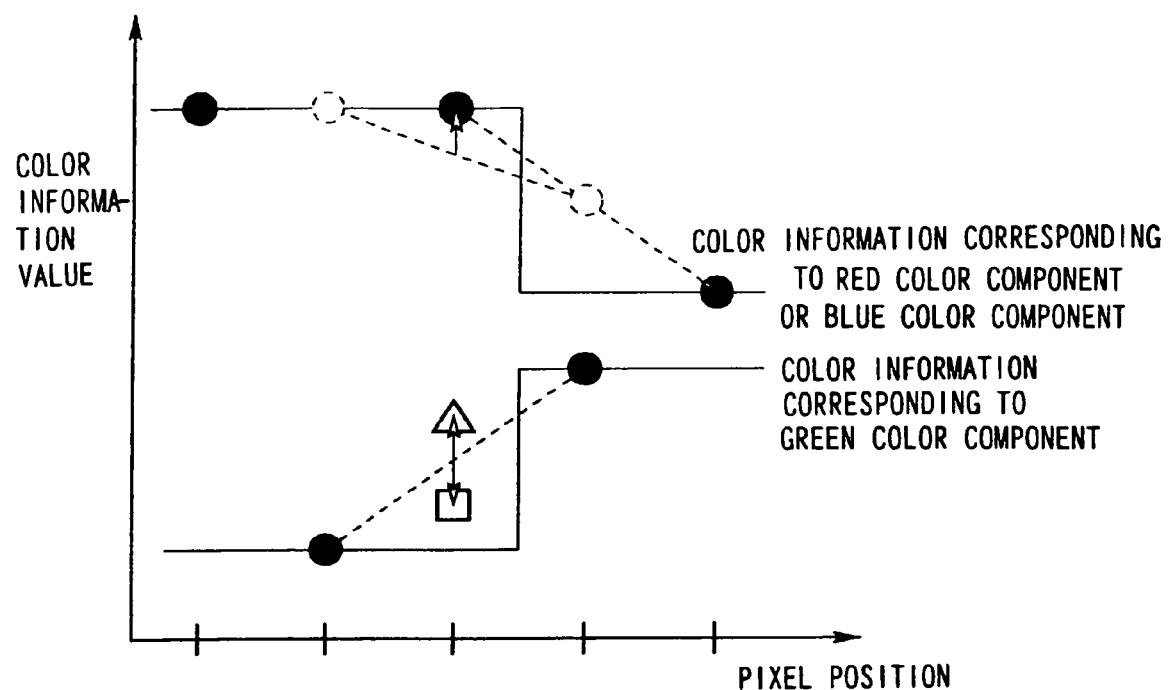
FIG. 15 illustrates the function of the weighting coefficient in the fourth embodiment.

For instance, when color information corresponding to the green color component and color information corresponding to the red color component (or the blue color component) are provided as indicated by ● in FIG. 15 (when the values indicated by the color information corresponding to the green color component start to increase at a specific position and the values indicated by the color information corresponding to the red color component (or the blue color component) start to decrease at the same position), the "local curvature information based upon a color component matching the color component at the interpolation target pixel" indicates a positive value. Thus, in such a case, if the "local curvature information based upon a color component matching and the color component at the interpolation target pixel" is added to the "local average information of the green color component" without first multiplying it with the weighting coefficient, the "local average information of the green color component", which should be corrected along the negative direction, becomes corrected in the positive direction as indicated by A in FIG. 15, resulting in an overshoot.

In other words, when color information corresponding to the green color component and the color information corresponding to the red color component (or the blue color component) change in opposite directions from a specific position at a color boundary, an overshoot or an undershoot occurs if the correctional term is calculated simply by adding the "local curvature information based upon a color component matching the color component at the interpolation target pixel" to the "local average information of the green color component" without first multiplying the "local curvature information based upon a color component matching the color component at the interpolation target pixel" by the weighting coefficient.

In the embodiment, if color information corresponding to the green color component and color information corresponding to the red color component (or the blue color component) are provided as indicated by ● in FIG. 15, the sign of the inclination Gk[i,j] corresponding to the green color component and the sign of the inclination Zk[i,j] corresponding to the red color component (or the blue color component) are opposite from each other resulting in the weighting coefficient being a negative value. Thus, the "local average information of the green color component" is corrected in the desired direction as indicated by □ in FIG. 15, preventing an overshoot or an undershoot from occurring.

Consequently, the occurrence of color artifacts attributable to over correction at a color boundary is reduced in the fourth embodiment.

It is to be noted that while no restrictions are imposed with regard to the value of the weighting coefficient in the fourth embodiment, restrictions may be imposed to set the value of the weighting coefficient within a specific range to ensure that the correctional term does not become too large.

For instance, the range for the weighting coefficient may be set; |Gk[i,j]/Zk[i,j]|≦5.

Fifth Embodiment

The following is an explanation of the operation achieved in the fifth embodiment.

It is to be noted that since the RB interpolation processing in the fifth embodiment is performed as in the first embodiment, its explanation is omitted. However, in the fifth embodiment, color differences containing the red color component are interpolated for some of the pixels at which color information corresponding to the green color component is present through formula 51 and color differences containing the red color component are interpolated for the remaining pixels at which color information corresponding to the green color component is present and for pixels at which color information corresponding to the blue color component is present through formula 52, as in the third embodiment.

Now, the G interpolation processing is explained.

In the fifth embodiment, in which the closest pixels at which color information corresponding to the green color component is present are set along the horizontal direction to a pixel to undergo the G interpolation processing as shown in FIGS. 3A and 3B, interpolation processing is achieved in the simplest manner by using the color information at the pixels set along the horizontal direction. Accordingly, the green color interpolation value G[i,j] is calculated in the fifth embodiment as in case 8 in the fourth embodiment.

Namely, the interpolation processing unit 17 calculates the green color interpolation value G[i,j] through formula 85.

$$G[i,j]=(G[i-1,j]+G[i+1,j])/2+Gk[i,j]/Zk[i,j]\cdot(2\cdot Z[i,j]-Z[i-2,j]-Z[i+2,j])/4 \quad \text{formula 85,}$$

with $$Gk[i,j]=G[i-1,j]-G[i+1,j] \quad \text{formula 81}$$

and $$Zk[i,j]=Z[i-2,j]-Z[i+2,j] \quad \text{formula 82.}$$

As indicated above, in the fifth embodiment, the local average information of the green color component is corrected by using the "local curvature information based upon a color component matching the color component at the interpolation target pixel" multiplied by the weighting coefficient (a value representing the correlation between the inclination Gk[i,j] corresponding to the green color component and the inclination Zk[i,j] corresponding to the red color component (or the blue color component): Gk[i,j]/Zk[i,j]) as in the fourth embodiment. As a result, the occurrence of color artifacts attributable to over correction at a color boundary can be reduced through the fifth embodiment.

It is to be noted that while an explanation is given above in reference to the embodiments on an example in which the color difference is used as a hue in the G interpolation processing and the RB interpolation processing, G interpolation processing and RB interpolation processing can be achieved in a similar manner by using a color ratio or the like as a hue instead of a color difference.

While an explanation is given above in reference to the individual embodiments on an example in which the curvature information based upon each color component is calculated through quadratic differentiation, the present invention is not limited to this example, and curvature information may be obtained through differentiation of a higher order. In other words, any method may be adopted as long as the degree of change in the rate of change occurring in each color component is ascertained.

Sixth Embodiment

The following is an explanation of the operation achieved in the sixth embodiment.

Figure 16:
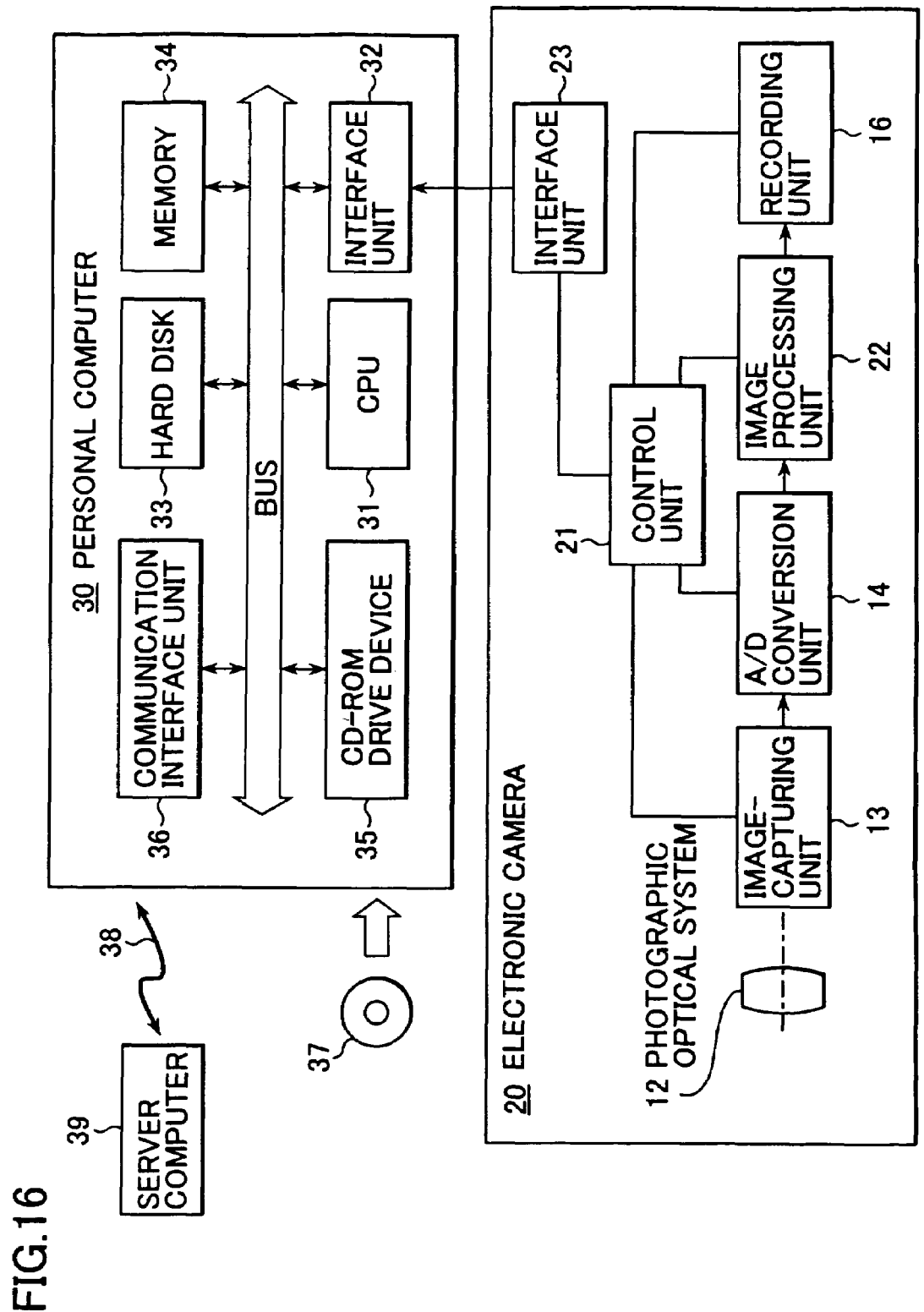
FIG. 16 is a functional block diagram of a sixth embodiment.
Figure 17:
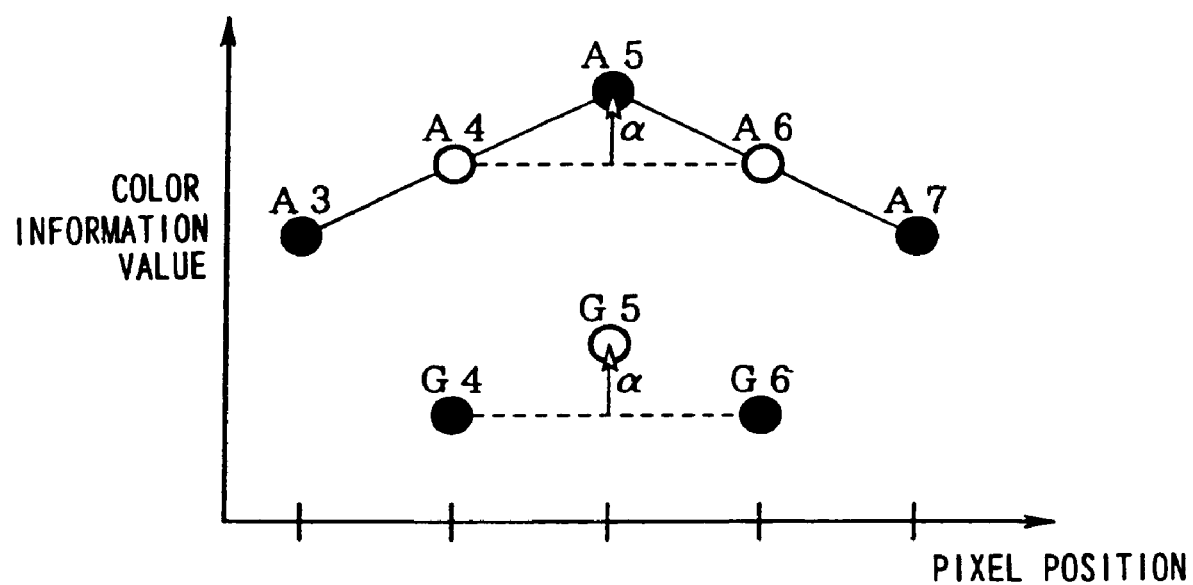
FIG. 17 illustrates an example of the interpolation processing in the prior art.

FIG. 16 is a functional block diagram representing the sixth embodiment. In FIG. 16, the same reference numbers are assigned to components achieving identical functions to those in the functional block diagram in FIG. 1 to preclude the necessity for repeated explanation of their structures.

The structure of an electronic camera 20 shown in FIG. 16 differs from that of the electronic camera 10 in FIG. 1 in that a control unit 21 and an image processing unit 22 in FIG. 16 replace the control unit 11 and the image processing unit 15 in FIG. 1, with an interface unit 23 in FIG. 16 provided as an additional component.

In addition, in FIG. 16, a personal computer 30 is provided with a CPU 31, an interface unit 32, a hard disk 33, a memory 34, a CD-ROM drive device 35 and a communication interface unit 36 with the CPU 31 connected to the interface unit 32, the hard disk 33, the memory 34, the CD-ROM drive device 35 and the communication interface unit 36 via a bus.

It is to be noted that an interpolation processing program (an interpolation processing program for executing interpolation processing similar to that implemented at the interpolation processing unit 17 in the various embodiments explained earlier) recorded at a recording medium such as a CD-ROM 37 is pre-installed at the personal computer 30 via the CD-ROM drive device 35. In other words, the interpolation processing program is stored at the hard disk 33 in an execution-ready state.

The following is an explanation of the operation achieved in the sixth embodiment, given in reference to FIG. 16.

First, image data generated as in the electronic camera 10 shown in FIG. 1 are provided to the image processing unit 22 in the electronic camera 20. The image data undergo image processing (e.g., gradation conversion processing) other than interpolation processing at the image processing unit 22, and the image data having undergone the image processing are then recorded at the recording unit 16 in an image file format.

This image file is provided to the personal computer 30 via the interface unit 23.

Upon obtaining the image file via the interface unit 32, the CPU 31 in the personal computer 30 executes the interpolation processing program. The image data with resolutions corresponding to the individual color components enhanced through the interpolation processing then undergo image compression and the like as necessary, are recorded at the hard disk 33 or the like and are finally output as data in a calorimetric system corresponding to the type of individual device connected, such as a display or a printer.

Namely, interpolation processing similar to that achieved in the embodiments explained earlier is implemented on the personal computer 30 in the sixth embodiment.

While an explanation is given in reference to the sixth embodiment on an example in which the interpolation processing program is provided through a recording medium such as the CD-ROM 37, the recording medium that may be used is not limited to a CD-ROM and any of various types of recording media including magnetic tape and a DVD may be used instead.

In addition, programs may be provided via a transmission medium such as a communication line 38, a typical example of which is the Internet. In other words, the programs which are first converted to signals on a carrier wave that carries a transmission medium may be transmitted. The personal computer 30 shown in FIG. 16 has such a function as well.

The personal computer 30 is provided with the communication interface unit 36 that connects with the communication line 38. A server computer 39, which provides the interpolation processing program, has the interpolation processing program stored at a recording medium such as an internal hard disk. The communication line 38 may be a communication line for connection with the Internet or for a personal computer communication or it may be a dedicated communication line 38. The communication line 38 may be a telephone line or a wireless telephone line for a mobile telephone or the like.

It is to be noted that the interpolation processing program according to the present invention that is executed within the electronic camera 10 in FIG. 1 is normally installed in a ROM (not shown) or the like at the time of camera production. However, the ROM in which the interpolation processing program is installed may be an overwritible ROM, and the electronic camera may be then connected to a computer assuming a structure similar to that shown in FIG. 16, to allow an upgrade program to be provided from a recording medium such as a CD-ROM via the computer. Furthermore, an upgrade program may be obtained via the Internet or the like as described earlier.

What is claimed is:

1. An interpolation processing apparatus that implements processing for supplementing a color component value at a pixel at which information corresponding to a color component is missing in image data provided in a colorimetric system constituted of a luminance component and the color component, with the luminance component having a higher spatial frequency than the color component and the luminance component present both at pixels having information corresponding to the color component and at pixels lacking information corresponding to the color component, comprising:

a color difference component value calculation section that calculates color difference component values at a plurality of pixels located near an interpolation target pixel to undergo interpolation processing and having both the luminance component and the color component by using luminance component values and color component values at the individual pixels;

a color difference component value interpolation section that calculates a color difference component value at the interpolation target pixel by using a median of the color difference component values at the plurality of pixels calculated by the color difference component value calculation section; and a color conversion section that interpolates a color component at the interpolation target pixel by using the luminance component at the interpolation target pixel to convert the color difference component value at the interpolation target pixel calculated by the color difference component value interpolation section to a color component, wherein the color difference component value interpolation section comprises:

a first color difference component value interpolation unit that calculates a color difference component value for the interpolation target pixel by using a median of color difference component values at a plurality of diagonally adjacent pixels if the color difference component values of the plurality of diagonally adjacent pixels adjacent to the interpolation target pixel along diagonal directions have been calculated by the color difference component value calculation section; and a second color difference component value interpolation unit that calculates a color difference component value for the interpolation target pixel by using a median of color difference component values at a plurality of vertically and horizontally adjacent pixels if the color difference component values of the plurality of vertically and horizontally adjacent pixels adjacent to the interpolation target pixel in the vertical direction and the horizontal direction have been calculated by the color difference component value calculation section or the first color difference component value interpolation unit.

2. An interpolation processing apparatus according to claim 1, wherein:

when the luminance component in the image data corresponds to a green color component and the color component in the image data corresponds to a red color component and a blue color component, the color difference component value interpolation section calculates a color difference component value for the interpolation target pixel by using a median of color difference component values containing the red color component at pixels near the interpolation target pixel if the green color component is present but the red color component is missing at the interpolation target pixel and calculates a color difference component value for the interpolation target pixel by using a median of color difference component values containing the blue color component at pixels near the interpolation target pixel if the green color component is present but the blue color component is missing at the interpolation target pixel.

3. An interpolation processing apparatus according to claim 1, wherein:

when the luminance component in the image data corresponds to a green color component and the color component in the image data corresponds to a red color component and a blue color component, the color difference component value interpolation section calculates a color difference component value for the interpolation target pixel by using a median of color difference component values containing the red color component at pixels set near the interpolation target pixel if the blue color component is present but the red color component is missing at the interpolation target pixel.

4. An interpolation processing apparatus according to claim 1, wherein:

when the luminance component in the image data corresponds to a green color component and the color component in the image data corresponds to a red color component and a blue color component, the color difference component value interpolation section calculates a color difference component value for the interpolation target pixel by using a median of color difference component values containing the blue color component at pixels set near the interpolation target pixel if the red color component is present but the blue color component is missing at the interpolation target pixel.

5. An interpolation processing apparatus according to claim 1, wherein a color component missing at the interpolation target pixel is present at only one pixel among four pixels set symmetrically along the vertical direction and the horizontal direction.

6. An interpolation processing apparatus that implements processing for supplementing a luminance component at a pixel at which information corresponding to a luminance component is missing and supplementing a color component at a pixel at which information corresponding to a color component is missing, on image data provided in a colorimetric system constituted of the luminance component and the color component, with the luminance component having a higher spatial frequency than the color component and a given pixel having only information corresponding to either the luminance component or the color component, comprising:

a luminance component interpolation section that interpolates a luminance component at a luminance component interpolation target pixel to undergo luminance component interpolation processing by using at least either "similarity manifesting between the luminance component interpolation target pixel and a pixel near the luminance component interpolation target pixel" or "a plurality of color components within a local area containing the luminance component interpolation target pixel";

a color difference component value calculation section that calculates color difference component values at a plurality of pixels located near an interpolation target pixel to undergo color component interpolation processing, having color component values and having luminance component values interpolated by the luminance component interpolation section, by using the luminance component values and color component values at the individual pixels;

a color difference component value interpolation section that calculates a color difference component value for the interpolation target pixel by using a median of the color difference component values at the plurality of pixels calculated by the color difference component value calculation section; and a color conversion section that interpolates a color component value for the interpolation target pixel by using the luminance component value at the interpolation target pixel to convert the color difference component value at the interpolation target pixel calculated by the color difference component value interpolation section to a color component value, wherein the color difference component value interpolation section comprises:

a first color difference component value interpolation unit that calculates a color difference component value for the interpolation target pixel by using a median of color difference component values at a plurality of diagonally adjacent pixels if the color difference component values of the plurality of diagonally adjacent pixels adjacent to the interpolation target pixel along diagonal directions have been calculated by the color difference component value calculation section; and a second color difference component value interpolation unit that calculates a color difference component value for the interpolation target pixel by using a median of color difference component values at a plurality of vertically and horizontally adjacent pixels if the color difference component values of the plurality of vertically and horizontally adjacent pixels adjacent to the interpolation target pixel in the vertical direction and the horizontal direction have been calculated by the color difference component value calculation section or the first color difference component value interpolation unit.

7. An interpolation processing apparatus according to claim 6, wherein:

when the luminance component in the image data corresponds to a green color component and the color component in the image data corresponds to a red color component and a blue color component, the color difference component value interpolation section calculates a color difference component value for the interpolation target pixel by using a median of color difference component values containing the red color component at pixels near the interpolation target pixel if the green color component is present but the red color component is missing at the interpolation target pixel and calculates a color difference component value for the interpolation target pixel by using a median of color difference component values containing the blue color component at pixels near the interpolation target pixel if the green color component is present but the blue color component is missing at the interpolation target pixel.

8. An interpolation processing apparatus according to claim 6, wherein:

when the luminance component in the image data corresponds to a green color component and the color component in the image data corresponds to a red color component and a blue color component, the color difference component value interpolation section calculates a color difference component value for the interpolation target pixel by using a median of color difference component values containing the red color component at pixels set near the interpolation target pixel if the blue color component is present but the red color component is missing at the interpolation target pixel.

9. An interpolation processing apparatus according to claim 6, wherein:

when the luminance component in the image data corresponds to a green color component and the color component in the image data corresponds to a red color component and a blue color component, the color difference component value interpolation section calculates a color difference component value for the interpolation target pixel by using a median of color difference component values containing the blue color component at pixels set near the interpolation target pixel if the red color component is present but the blue color component is missing at the interpolation target pixel.

10. An interpolation processing apparatus according to claim 6, wherein a color component missing at the interpolation target pixel is present at only one pixel among four pixels set symmetrically along the vertical direction and the horizontal direction.

11. A computer-readable recording medium having recorded therein an interpolation processing program for implementing on a computer processing supplementing a color component value at a pixel at which information corresponding to a color component is missing, on image data provided in a colorimetric system constituted of a luminance component and the color component, with the luminance component having a higher spatial frequency than the color component and the luminance component present both at pixels having information corresponding to the color component and at pixels lacking information corresponding to the color component; the interpolation processing program comprising:

a color difference component value calculation step in which color difference component values for a plurality of pixels near an interpolation target pixel to undergo interpolation processing and having information corresponding to both the luminance component and the color component are calculated by using luminance component values and color component values at the individual pixels;

a color difference component value interpolation step in which a color difference component value for the interpolation target pixel is calculated by using a median of the color difference component values at the plurality of pixels calculated in the color difference component value calculation step; and a color conversion step in which a color component value at the interpolation target pixel is interpolated by using a value indicated by the luminance component present at the interpolation target pixel to convert the color difference component value of the interpolation target pixel calculated in the color difference component value interpolation step to a color component value, wherein the color difference component value interpolation step comprises:

a first color difference component value interpolation step that calculates a color difference component value for the interpolation target pixel by using a median of color difference component values at a plurality of diagonally adjacent pixels if the color difference component values of the plurality of diagonally adjacent pixels adjacent to the interpolation target pixel along diagonal directions have been calculated by the color difference component value calculation step; and a second color difference component value interpolation step that calculates a color difference component value for the interpolation target pixel by using a median of color difference component values at a plurality of vertically and horizontally adjacent pixels if the color difference component values of the plurality of vertically and horizontally adjacent pixels adjacent to the interpolation target pixel in the vertical direction and the horizontal direction have been calculated by the color difference component value calculation step or the first color difference component value interpolation step.

12. A computer-readable recording medium having recorded therein an interpolation processing program for implementing on a computer processing for supplementing a luminance component value at a pixel at which information corresponding to a luminance component is missing and a color component value at a pixel at which information corresponding to a color component missing, on image data provided in a colorimetric system constituted of the luminance component and the color component, with the luminance component having a higher spatial frequency than the color component and information corresponding to either the luminance component or the color component present at each pixel, the interpolation processing program comprising:
- a luminance component interpolation step in which a luminance component value is interpolated for a luminance component interpolation target pixel to undergo luminance component interpolation processing by using at least either "similarity between the luminance component interpolation target pixel and a pixel near the luminance component interpolation target pixel" or "information corresponding to a plurality of color components within a local area containing the luminance component interpolation target pixel";
- a color difference component value calculation step in which color difference component values at a plurality of pixels located near an interpolation target pixel to undergo color component interpolation processing, having color component values and having luminance component values interpolated in the luminance component interpolation step are calculated by using the luminance component values and color component values at the individual pixels;
- a color difference component value interpolation step in which a color difference component value for the interpolation target pixel is calculated by using a median of the color difference component values at the plurality of pixels calculated in the color difference component value calculation step; and
- a color conversion step in which a color component value is interpolated for the interpolation target pixel by using the luminance component value at the interpolation target pixel to convert the color difference component value at the interpolation target pixel calculated in the color difference component value interpolation step to a color component value, wherein the color difference component value interpolation step comprises:
- a first color difference component value interpolation step that calculates a color difference component value for the interpolation target pixel by using a median of color difference component values at a plurality of diagonally adjacent pixels if the color difference component values of the plurality of diagonally adjacent pixels adjacent to the interpolation target pixel along diagonal directions have been calculated by the color difference component value calculation step; and
- a second color difference component value interpolation step that calculates a color difference component value for the interpolation target pixel by using a median of color difference component values at a plurality of vertically and horizontally adjacent pixels if the color difference component values of the plurality of vertically and horizontally adjacent pixels adjacent to the interpolation target pixel in the vertical direction and the horizontal direction have been calculated by the color difference component value calculation step or the first color difference component value interpolation step.

13. An interpolation processing apparatus that implements processing for supplementing a color difference component value at a pixel at which information corresponding to a color difference component is missing in image data provided in a colorimetric system constituted of a luminance component and the color difference component, with the luminance component having a higher spatial frequency than the color difference component and the luminance component present both at pixels having information corresponding to the color difference component and at pixels lacking information corresponding to the color difference component, comprising:
- a first color difference component value interpolation unit that calculates a color difference component value for the interpolation target pixel by using a median of color difference component values at a plurality of diagonally adjacent pixels if the color difference component values of the plurality of diagonally adjacent pixels adjacent to the interpolation target pixel along diagonal directions are present; and
- a second color difference component value interpolation unit that calculates a color difference component value for the interpolation target pixel by using a median of color difference component values at a plurality of vertically and horizontally adjacent pixels if the color difference component values of the plurality of vertically and horizontally adjacent pixels adjacent to the interpolation target pixel in the vertical direction and the horizontal direction are present.

14. An interpolation processing apparatus that implements processing for supplementing a color difference component value at a pixel at which information corresponding to a color difference component is missing in image data provided in a colorimetric system constituted of a luminance component and the color difference component, with the luminance component having a higher spatial freciuency than the color difference component and the luminance component present both at pixels having information corresponding to the color difference component and at pixels lacking information corresponding to the color difference component, comprising:
- a first color difference component value interpolation unit that calculates a color difference component value for the interpolation target pixel locating at a central position among pixels lacking information corresponding to the color difference component by using a median of color difference component values at symmetrically positioned at least four adiacent pixels; and
- a second color difference component value interpolation unit that calculates a color difference component value for the interpolation target pixel locating at a central position among pixels lacking information corresponding to the color difference component by using a median of color difference component values at symmetrically positioned at least four adjacent pixels including color difference values that have been calculated by the first color difference component value interpolation unit,
- wherein a color difference component missing at the interpolation target pixel is present at only one pixel among at least four pixels set symmetrically along the vertical direction and the horizontal direction,
- the first color difference component value interpolation unit calculates a color difference component value for the interpolation target pixel by using a median of color difference component values at a plurality of diagonally adjacent pixels, and
- the second color difference component value interpolation unit calculates a color difference component value for the interpolation target pixel by using a median of color difference component values at a plurality of vertically and horizontally adjacent pixels.

15. An interpolation processing apparatus according to claim 14, wherein:
- the colorimetric system is a YCbCr colorimetric system with Y, Cb and Cr culled at a ratio of 4:2:0.

* * * * *